United States Patent
Tokita et al.

(10) Patent No.: US 9,436,314 B2
(45) Date of Patent: Sep. 6, 2016

(54) DISPLAY DEVICE

(71) Applicant: Japan Display Inc., Tokyo (JP)

(72) Inventors: Masahiro Tokita, Tokyo (JP); Toshiaki Atsuta, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/070,404

(22) Filed: Mar. 15, 2016

(65) Prior Publication Data

US 2016/0195996 A1 Jul. 7, 2016

Related U.S. Application Data

(63) Continuation of application No. 14/564,125, filed on Dec. 9, 2014, now Pat. No. 9,317,169.

(30) Foreign Application Priority Data

Dec. 9, 2013 (JP) .................. 2013-254209

(51) Int. Cl.
G06F 3/0488 (2013.01)
G06F 3/041 (2006.01)
G06F 3/044 (2006.01)

(52) U.S. Cl.
CPC ............ *G06F 3/0416* (2013.01); *G06F 3/044* (2013.01); *G06F 3/0412* (2013.01)

(58) Field of Classification Search
CPC ..... G06F 3/0488; G06F 3/044; G06F 3/0412
See application file for complete search history.

(56) References Cited

U.S. PATENT DOCUMENTS

| 8,319,737 | B2 | 11/2012 | Noguchi et al. |
| 2013/0241869 | A1 | 9/2013 | Kida et al. |
| 2014/0078415 | A1 | 3/2014 | Tanabe et al. |
| 2014/0078701 | A1 | 3/2014 | Tanabe et al. |
| 2015/0185927 | A1 | 7/2015 | Inoue et al. |

FOREIGN PATENT DOCUMENTS

JP 2009-258182 A 11/2009

*Primary Examiner* — Ricardo L Osorio
(74) *Attorney, Agent, or Firm* — Typha IP LLC

(57) ABSTRACT

A display device is configured in a display state to allow the common electrode to function as an electrode for display and a scanning electrode for a touch panel, to which a common voltage and a first scanning pulse voltage are supplied, and to allow a detection circuit to detect a touched position based on the voltage detected by the first and the second detection electrodes. In a display stop state, the first detection electrode is configured to function as a temporary scanning electrode, and the detection circuit is configured to supply a second scanning pulse voltage to the first detection electrode so as to detect existence of a swipe based on the voltage detected by the second detection electrode.

11 Claims, 25 Drawing Sheets

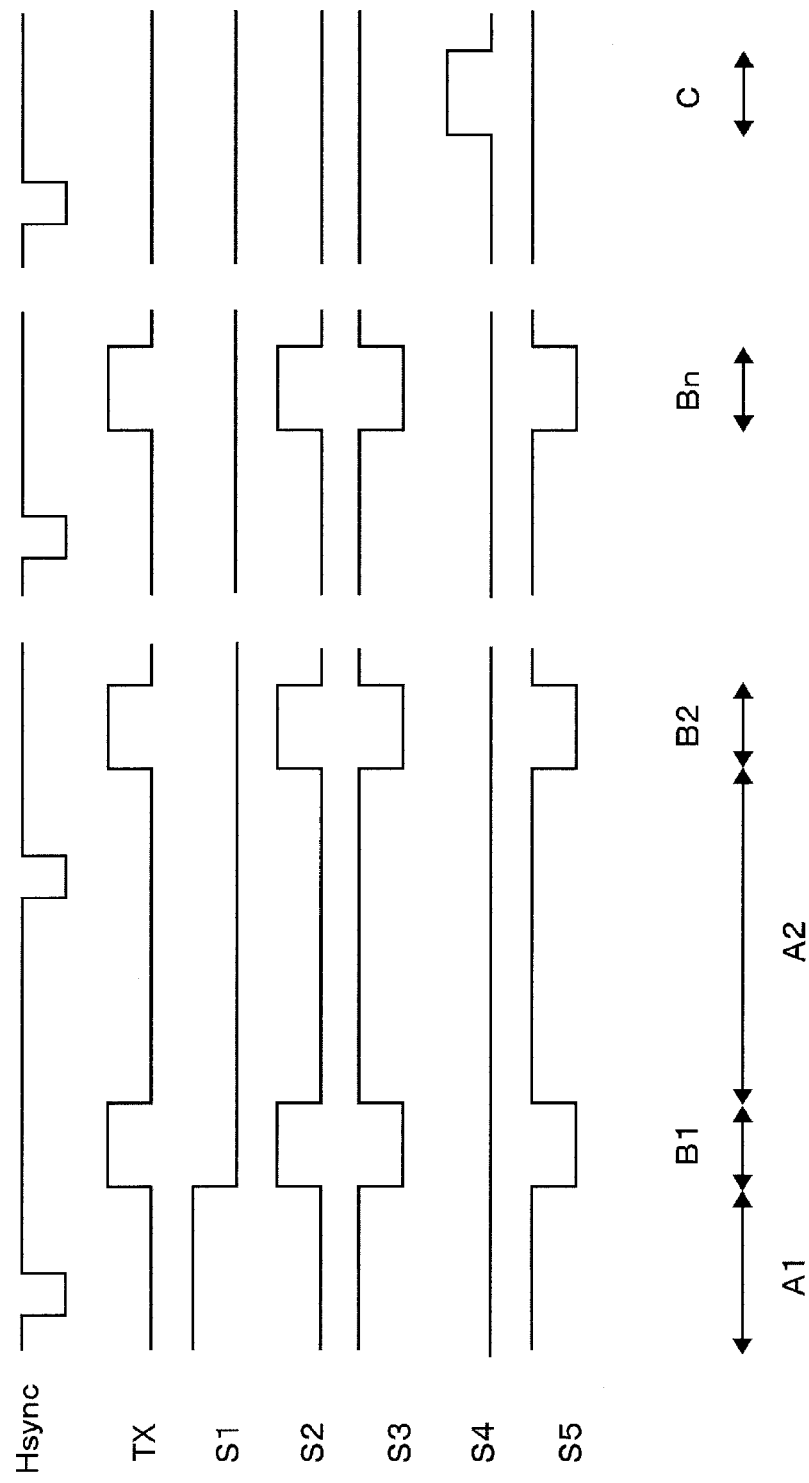

FIG. 9C

| TPC_VOFSCTX[5:0] | V<sub>OFSC</sub> |
|---|---|
| 6'h00 | 4.000V |
| 6'h01 | 3.941V |
| 6'h02 | 3.882V |
| 6'h03 | 3.824V |
| 6'h04 | 3.765V |
| 6'h05 | 3.706V |
| 6'h06 | 3.647V |
| 6'h07 | 3.588V |
| 6'h08 | 3.529V |
| 6'h09 | 3.471V |
| 6'h0A | 3.412V |
| 6'h0B | 3.353V |
| 6'h0C | 3.294V |
| 6'h0D | 3.235V |
| 6'h0E | 3.176V |
| 6'h0F | 3.118V |
| 6'h10 | 3.059V |
| 6'h11 | 3.000V |
| 6'h12 | 2.941V |
| 6'h13 | 2.882V |
| 6'h14 | 2.824V |
| 6'h15 | 2.765V |
| 6'h16 | 2.706V |
| 6'h17 | 2.647V |
| 6'h18 | 2.588V |
| 6'h19 | 2.529V |
| 6'h1A | 2.471V |
| 6'h1B | 2.412V |
| 6'h1C | 2.353V |
| 6'h1D | 2.294V |
| 6'h1E | 2.235V |
| 6'h1F | 2.176V |

| TPC_VOFSCTX[5:0] | V<sub>OFSC</sub> |
|---|---|
| 6'h20 | 2.118V |
| 6'h21 | 2.059V |
| 6'h22 | 2.000V |
| 6'h23 | 1.941V |
| 6'h24 | 1.882V |
| 6'h25 | 1.824V |
| 6'h26 | 1.765V |
| 6'h27 | 1.706V |
| 6'h28 | 1.647V |
| 6'h29 | 1.588V |
| 6'h2A | 1.529V |
| 6'h2B | 1.471V |
| 6'h2C | 1.412V |
| 6'h2D | 1.353V |
| 6'h2E | 1.294V |
| 6'h2F | 1.235V |
| 6'h30 | 1.176V |
| 6'h31 | 1.118V |
| 6'h32 | 1.059V |
| 6'h33 | 1.000V |
| 6'h34 | 0.941V |
| 6'h35 | 0.882V |
| 6'h36 | 0.824V |
| 6'h37 | 0.765V |
| 6'h38 | 0.706V |
| 6'h39 | 0.647V |
| 6'h3A | 0.588V |
| 6'h3B | 0.529V |
| 6'h3C | 0.471V |
| 6'h3D | 0.412V |
| 6'h3E | 0.353V |
| 6'h3F | 0.294V |

FIG. 9D

| CLB_DATA[7:0] | $V_{DAC}(V)$ | CLB_DATA[7:0] | $V_{DAC}(V)$ |
|---|---|---|---|
| 8'h00 | 4.000 | 8'h10 | 3.765 |
| 8'h01 | 3.985 | 8'h11 | 3.750 |
| 8'h02 | 3.971 | 8'h12 | 3.735 |
| 8'h03 | 3.956 | 8'h13 | 3.721 |
| 8'h04 | 3.941 | 8'h14 | 3.706 |
| 8'h05 | 3.926 | 8'h15 | 3.691 |
| 8'h06 | 3.912 | 8'h16 | 3.676 |
| 8'h07 | 3.897 | 8'h17 | 3.662 |
| 8'h08 | 3.882 | 8'h18 | 3.647 |
| 8'h09 | 3.868 | 8'h19 | 3.632 |
| 8'h0A | 3.853 | 8'h1A | 3.618 |
| 8'h0B | 3.838 | : | : |
| 8'h0C | 3.824 | 8'hFC | 0.294 |
| 8'h0D | 3.809 | 8'hFD | 0.279 |
| 8'h0E | 3.794 | 8'hFE | 0.265 |
| 8'h0F | 3.779 | 8'hFF | 0.250 |

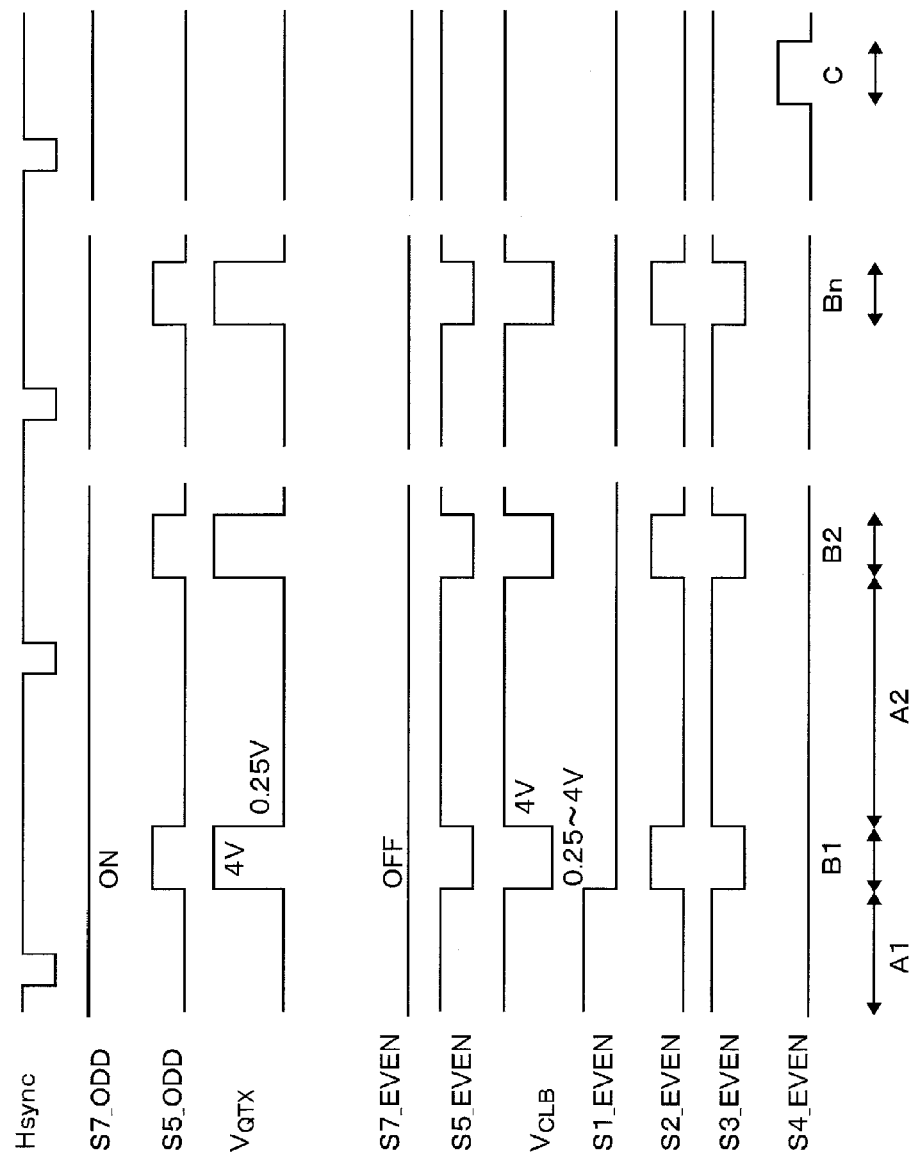

DISPLAY DEVICE

CROSS-REFERENCE TO RELATED APPLICATION

This application is a continuation of U.S. patent application Ser. No. 14/564,125, filed on Dec. 9, 2014. Further, this application claims priority from Japanese Patent Application JP2013-254209 filed on Dec. 9, 2013, the entire contents of which are hereby incorporated by reference into this application.

BACKGROUND

The present invention relates to a display device which is applicable to, for example, an in-cell type liquid crystal display device having a built-in touch panel.

The display device equipped with a unit for inputting information (hereinafter referred to as a touch sensor or a touch panel) by touching the display screen with a finger of a user or a pen (contact-pressure operation, hereinafter simply referred to as touch) has been used for mobile electronic devices such as a PDA and a portable terminal, various types of household electric appliances, and the automated teller machine.

The touch panel of electrostatic capacitance type for detecting capacitance change at the touched point has been known. JP-A-2009-258182 discloses the in-cell type liquid crystal display device provided with the electrostatic capacitance type touch panel with the touch panel function built in the liquid crystal display panel. The in-cell type liquid crystal display device employs the scanning electrode for the touch panel obtained by dividing the counter electrode (common electrode) formed on the TFT substrate that constitutes the liquid crystal display panel.

SUMMARY

The liquid crystal display device that uses the generally employed out-cell type touch panel is configured to realize the low power consumption mode by turning off the display of the liquid crystal display panel to bring the touch panel into the sparse detection mode. Upon the touch or movement (swipe) in the low power consumption mode, the detection information is sent from the touch panel controller IC to the host controller which will make a transition to the normal display/normal detection mode.

The in-cell type liquid crystal display device having the built-in touch panel function allows the common electrode to function as the scanning electrode for the touch panel. When scanning the scanning electrode in the state where the display operation of the liquid crystal display panel is stopped, the DC voltage is applied to the liquid crystal layer of the liquid crystal display panel to cause the problem of burning the liquid crystal layer.

It is an object of the present invention to provide the technique that allows detection of the touch panel of the in-cell type display device having the built-in touch panel function when the display operation is stopped.

Other objects and novel features of the present invention will be clarified by the following description and accompanying drawings.

The present invention will be briefly described taking the representative structure as an example.

The display device includes an array substrate, a counter substrate and a detection circuit. The display device includes a first mode and a second mode. The array substrate includes a pixel electrode and a common electrode. The counter substrate includes a first detection electrode and a second detection electrode. The first detection electrode and the second detection electrode are alternately arranged. In the first mode, the common electrode is allowed to function as an electrode for display and a scanning electrode for a touch panel, to which a common voltage and a first scanning pulse voltage are supplied, and the detection circuit is configured to detect a touched position based on a voltage detected by the first and the second detection electrodes. In the second mode, the first detection electrode is allowed to function as a temporary scanning electrode, and the detection circuit is configured to supply a second scanning pulse voltage to the first detection electrode so as to detect existence of a swipe based on a voltage detected by the second detection electrode.

BRIEF DESCRIPTION OF THE DRAWINGS

FIG. 6 is a timing chart for explaining the operation of the detection circuit in the display state according to the first embodiment;

FIG. 9C is a view representing a set register of the pseudo Tx scanning pulse voltage of the detection circuit according to the first embodiment;

FIG. 9D is a view representing a relationship between the calibration voltage and the memory data of the detection circuit according to the first embodiment;

FIG. 10 is a view representing each timing of the signals in the display stop state of the detection circuit according to the first embodiment;

DESCRIPTION OF THE PREFERRED EMBODIMENTS

Figure 1A:
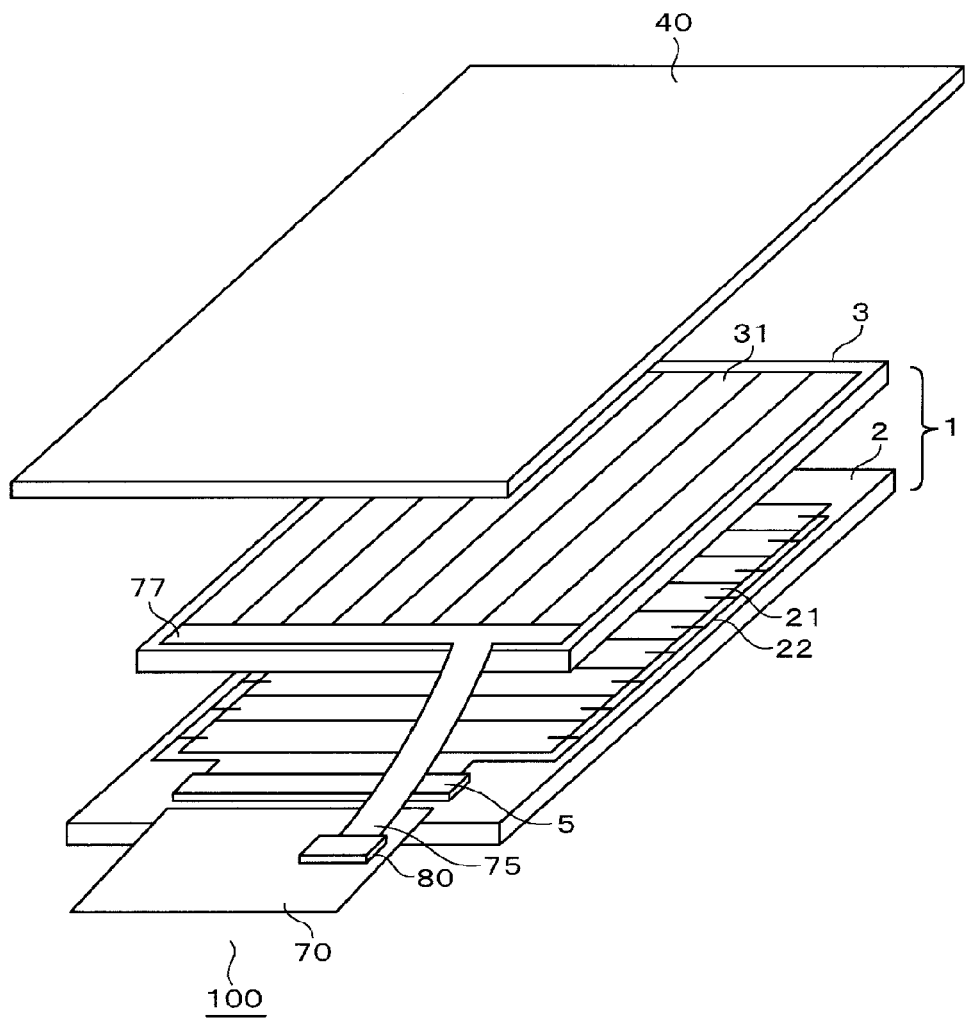
FIG. 1A is an exploded perspective view schematically showing a structure of a display device according to a first embodiment.

An embodiment will be described referring to the drawings. It is to be noted that embodiments are mere examples, and modifications which can be easily expected by those skilled in the art while retaining the subject matter of the invention may be regarded as being within the scope of the invention. Information on the embodiment such as width, thickness and shape of the respective elements may be expressed in the less complex manner than the actual case for the purpose of clarifying the explanation. This case is also one of examples, and not intended to limit the interpretation of the invention. In both description and drawings, the same elements as those already described will be designated with the same codes, and explanations of those elements will be omitted suitably.

First Embodiment

The display device according to the first embodiment is of in-cell type having the touch panel built in the display panel. The structure of the display device according to the first embodiment will be described referring to FIGS. 1A to 2.

Figure 1B:
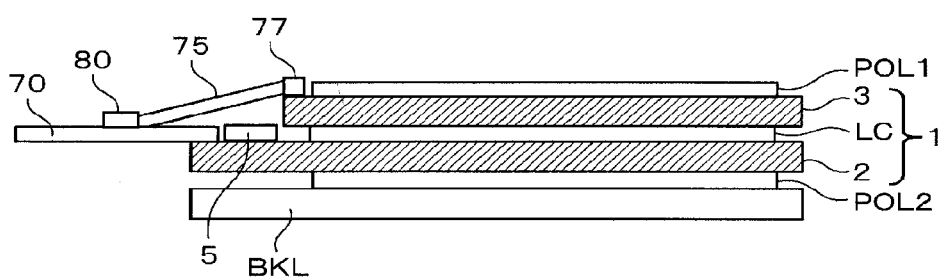
FIG. 1B is a cross sectional view of the display device according to the first embodiment.
Figure 2:
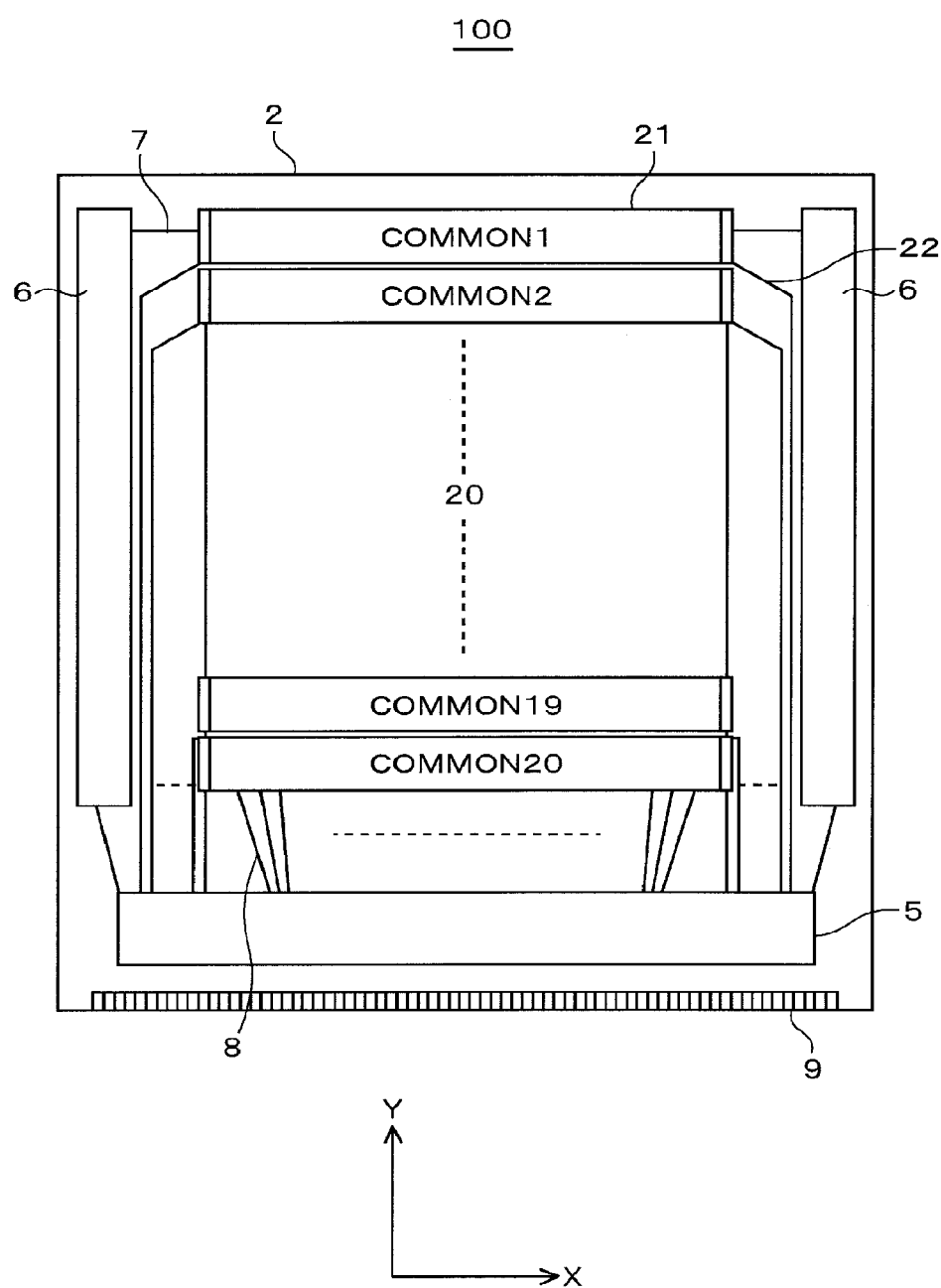
FIG. 2 is a plan view of the display device according to the first embodiment.

FIG. 1A is an exploded perspective view schematically showing the structure of the display device according to the first embodiment. FIG. 1B is a cross sectional view of the display device according to the first embodiment. FIG. 2 is a plan view schematically showing the structure of the display device according to the first embodiment.

As FIGS. 1A and 1B show, a display device 100 includes a display panel 1, a driver IC 5, a flexible wiring substrate 70, a front window (or protective film) 40, a flexible wiring substrate 75 and a backlight BKL. The display panel 1 includes a TFT substrate (array substrate) 2, a CF substrate (counter substrate) 3, and polarizing plates POL1 and POL2. A back surface-side transparent conductive film (CD) on the CF substrate 3 is divided into belt-like patterns (stripe patterns) to form detection electrodes 31 for the touch panel. A common electrode (counter electrode) 21 formed inside the TFT substrate 2 is divided into belt-like patterns to form a plurality of blocks each serving as the scanning electrode for the touch panel. This configuration reduces the number of the touch panel substrates employed for the generally employed touch panel. The display device 100 is configured to have circuits for driving and detecting the touch panel, which are installed inside the driver IC 5. The driver IC 5 is formed through the CMOS process on the single semiconductor substrate, and COG mounted on the TFT substrate 2 in the form of the semiconductor chip.

As FIG. 2 shows, the common electrode (COMMON) 21 is provided on the TFT substrate 2. For example, both ends of 20 common electrodes 21 are connected so as to be connected to a common electrode signal line 22. The display device 100 allows the belt-like common electrode 21 to serve as the scanning electrode Tx, and a part of the detection electrodes 31 to serve as a temporary scanning electrode Tx'. The single common electrode 21 is shared by pixels corresponding to 64 lines, for example. Therefore, the common electrode signal contains the common voltage used for displaying images, and a scanning pulse voltage used for detecting the touched position. When the scanning pulse voltage is applied to the common electrode 21, the detection electrode 31 that constitutes the capacitance, and is arranged apart from the common electrode 21 at a constant interval generates a detection signal. The detection signal is extracted by the driver IC 5 via a connection part 77, the flexible wiring substrate 75, a connector 80, and a flexible wiring substrate 70. The TFT substrate 2 includes various circuits, wirings and terminals formed thereon, for example, a gate scan circuit 6, a scanning signal line 7, a video signal line 8, and an input terminal 9 for the driver IC 5 as the connection terminal to the flexible wiring substrate 70 in addition to the common electrode signal line 22. For the purpose of avoiding complication of the figure, FIG. 1A shows only nine common electrodes 21 and eight detection electrodes 31, and omits the gate scan circuit 6 shown in FIG. 2. FIG. 2 omits a selector circuit for selecting the RGB video signal for the purpose of avoiding complication of the figure.

The TFT substrate 2 includes a pixel section 20. The pixel electrode and the common electrode 21 are used for displaying the image as a part of the pixel. The single common electrode is shared by a plurality of pixels (for example, pixels corresponding to 64 lines). A liquid crystal display layer LC is interposed between the TFT substrate 2 and the CF substrate 3. Each of the detection electrodes 31 formed on the CF substrate 3 and the common electrodes 21 formed on the TFT substrate constitutes the capacitance. The voltage of the detection circuit 31 varies upon application of the drive signal to the common electrode 21. When the conductor such as a finger is brought into the vicinity of or contact with the electrode via the front window 40, the capacitance varies to change the voltage generated in the detection electrode 31 in comparison with the case where it is not brought into the vicinity of or contact with the electrode. Detection of the capacitance change between the common electrode 21 and the detection electrode 31 formed in the display panel makes it possible to provide the display panel with the touch panel function.

<Mutual Detection>

The touch panel function (mutual detection, first mutual detection) of the display device in the display state according to the first embodiment will be described referring to FIGS. 3 to 7B. The mutual detection is performed in the display state through the common electrodes 21 constituting the pixel, which share the scanning electrode of the touch panel to detect the capacitance change in the cross-over capacitance between the scanning electrode and the detection electrode so that the touched position is detected. For example, performing the display and touch detection while displaying the single frame in a time division manner is included in the display state. In other words, it is possible to use the common electrode for display and touch detection in a time division manner in the display state. The state where the common electrode is used for display and touch detection in the time division manner will be referred to as a first mode. The display state falls under the first mode.

Figure 3:
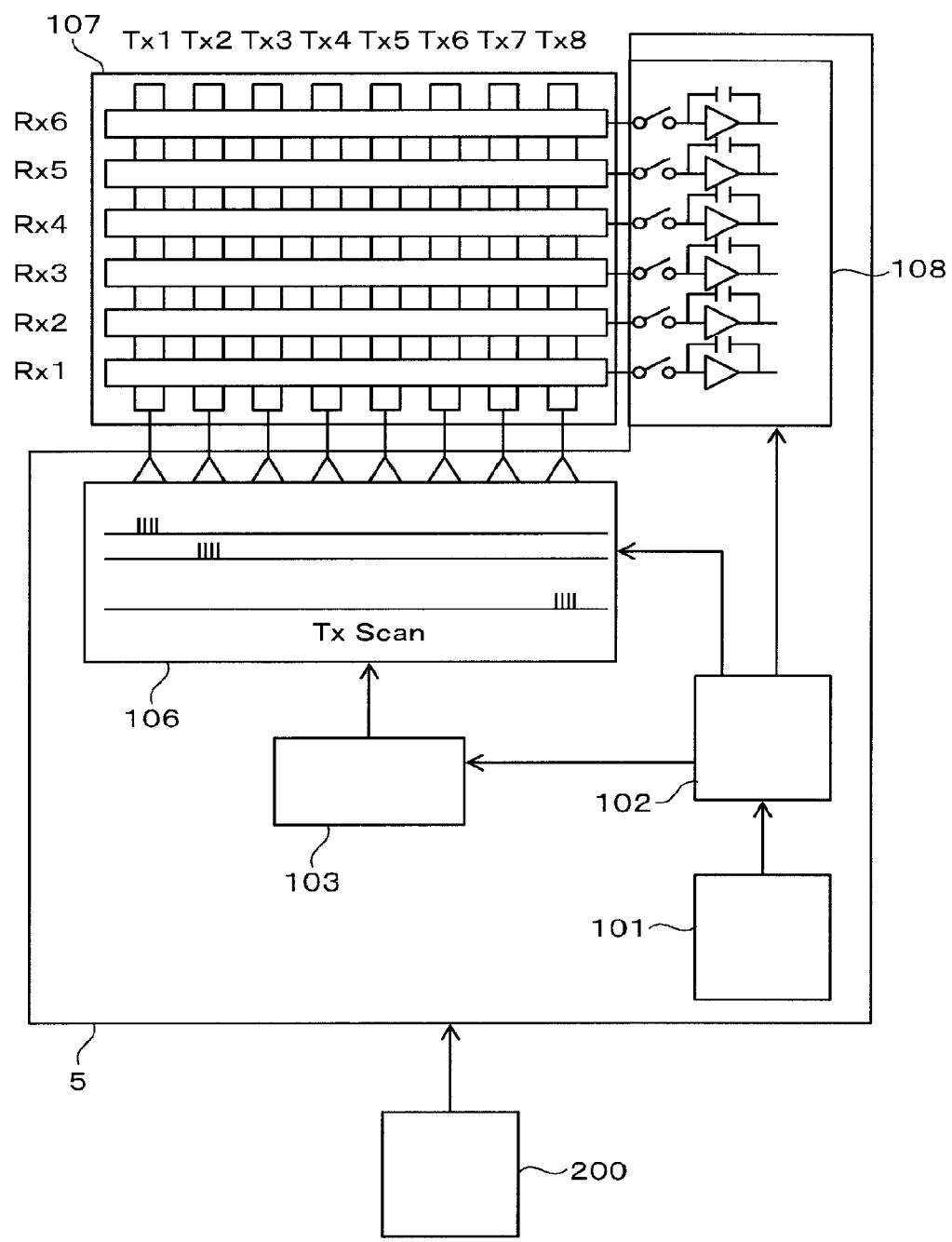
FIG. 3 is a block diagram schematically showing an entire structure of a touch panel of the display device in a display mode according to the first embodiment.
Figure 4:
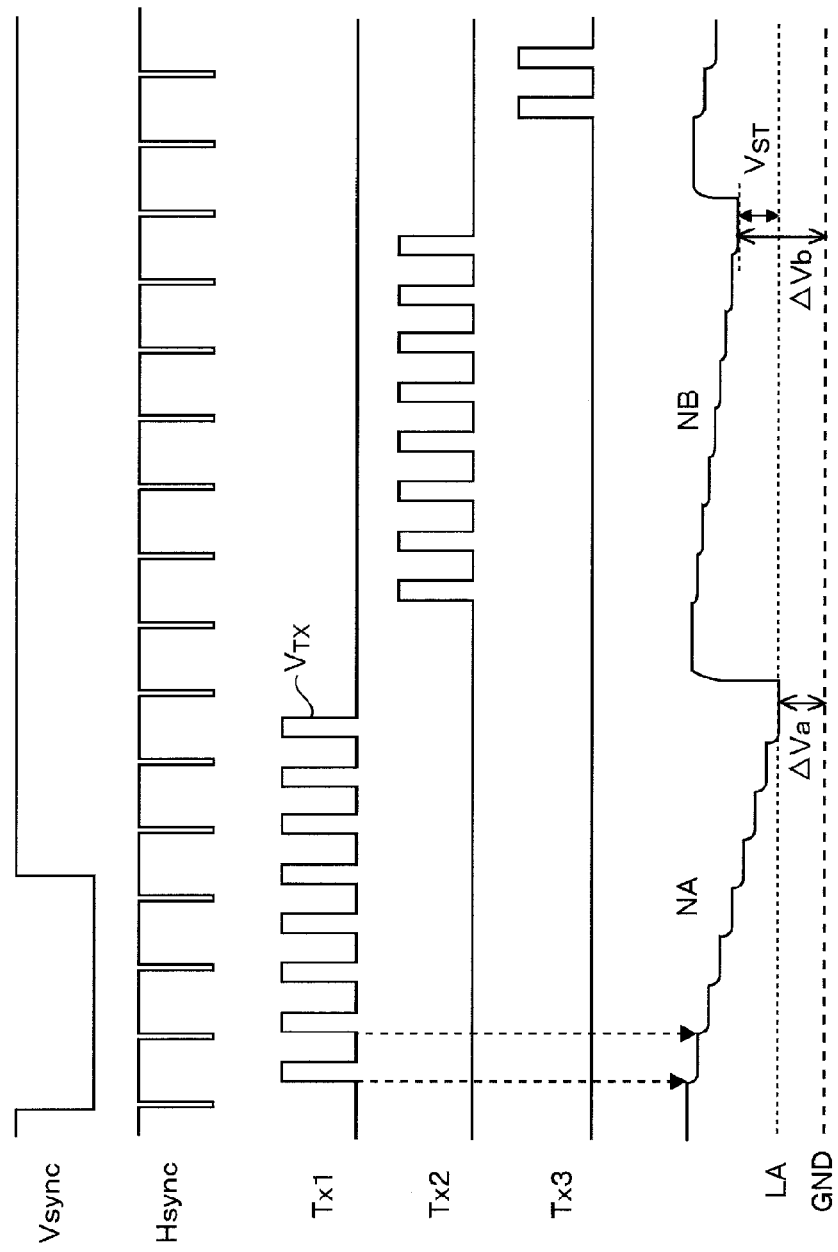
FIG. 4 is a timing chart of an operation for detecting a touch on the touch panel of the display device in the display state according to the first embodiment.
Figure 5:
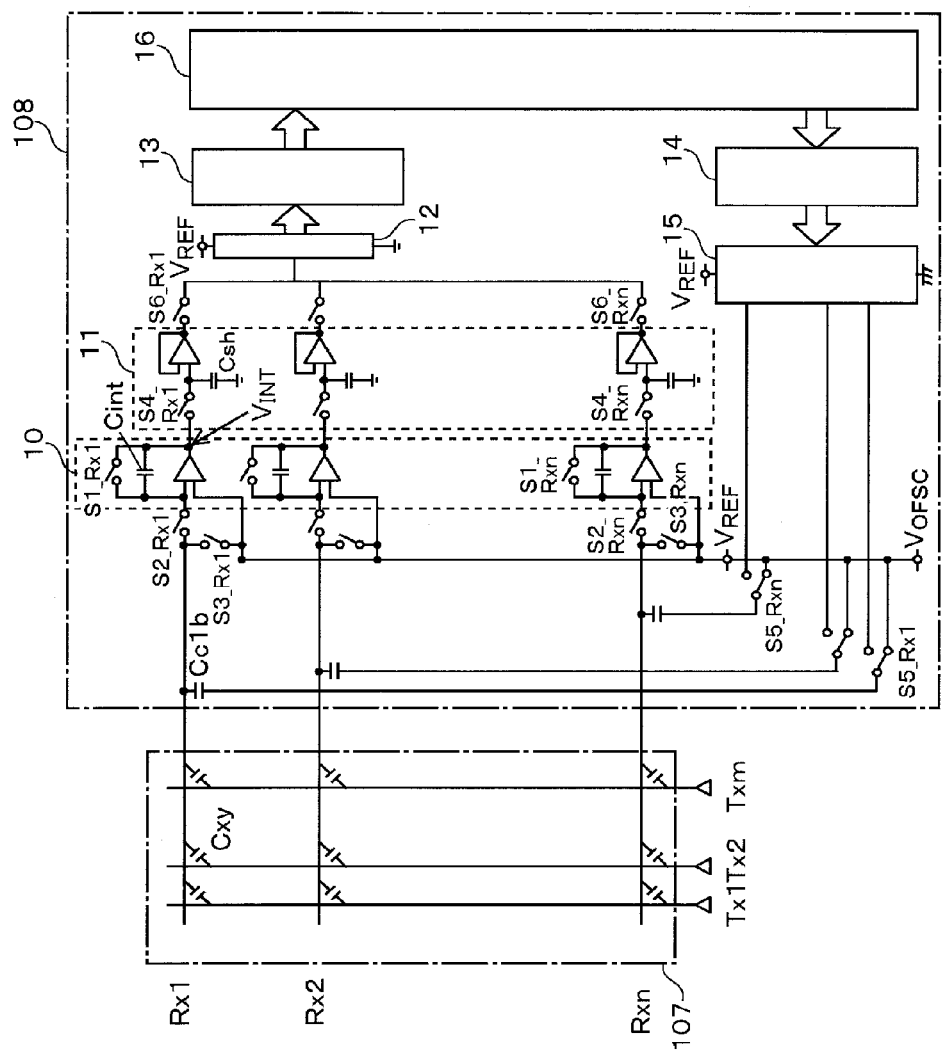
FIG. 5 is a circuit diagram representing more specific structure of a detection circuit according to the first embodiment.
Figure 7A:
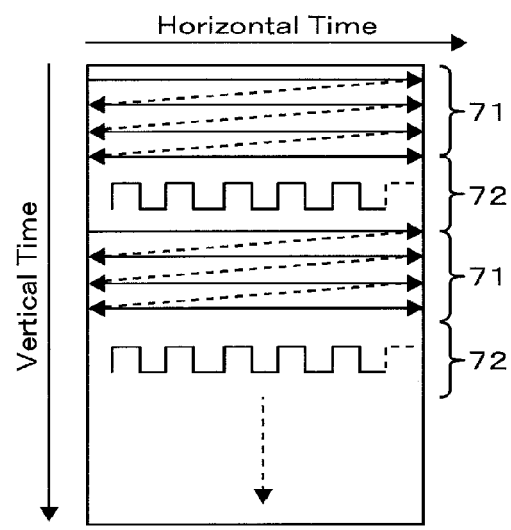
FIG. 7A is a schematic view representing operations of display and touch scan (division V blank drive) of the display device in the display state according to the first embodiment.
Figure 7B:
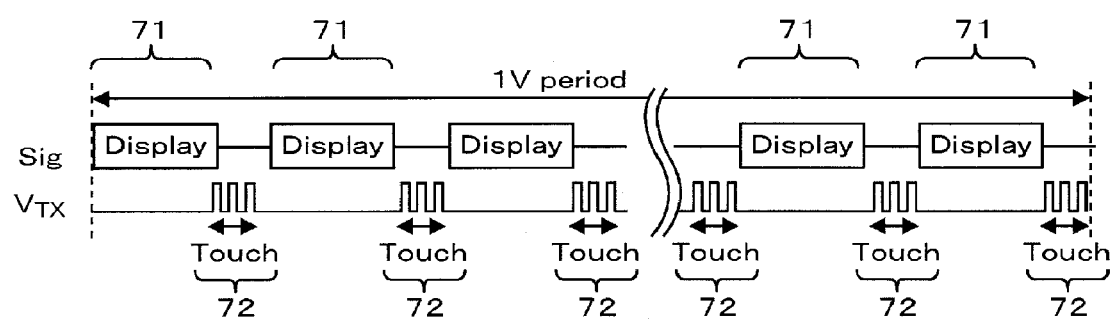
FIG. 7B is a view representing the division V blank drive timing of the display device in the display state according to the first embodiment.

FIG. 3 is a block diagram schematically showing an entire structure of the touch panel of the display device in the display state according to the first embodiment. FIG. 4 is a timing chart of the touch detection on the touch panel when the display device according to the first embodiment is in the display state. FIG. 5 is a circuit diagram representing more specific structure of the detection circuit according to the first embodiment. FIG. 6 is a timing chart for explaining the operation of the detection circuit in the display state according to the first embodiment. FIG. 7A is a schematic view of the display and touch scan (division V blank drive) when the display device is in the display state according to the first embodiment. FIG. 7B is a view representing the division V blank drive timing when the display device is in the display state according to the first embodiment.

The touch panel function of the display device 100 is realized by a drive circuit 101, a sequencer 102, a scanning pulse voltage generation circuit 103, a decoder circuit 106, a touch panel 107 and a detection circuit 108. Referring to FIG. 3, the circuits except the touch panel 107 are installed in the driver IC 5.

The touch panel 107 has electrode patterns (scanning electrodes Tx1 to Tx8, detection electrodes Rx1 to Rx6) formed thereon as sensor terminals for detecting the user's touch. The scanning electrode Tx is a general term representing the scanning electrodes Tx1 to Txm, and the detection electrode Rx is a general term representing the detection electrodes Rx1 to Rxn. As the display device 100 has the touch panel function built in the display panel 1, the common electrode 21 serves as the scanning electrode Tx. FIG. 3 shows only 8 scanning electrodes Tx1 to Tx8, and 6 detection electrodes Rx1 to Rx6 for the purpose of avoiding complexity of the figure.

The drive circuit 101 sends a synchronous signal (vertical synchronous signal (Vsync) and horizontal synchronous signal (Hsync)) to the sequencer 102 for displaying the image on the display panel 1. The sequencer 102 controls the scanning pulse voltage generation circuit 103, the decoder circuit 106, and the detection circuit 108 for timing control of the touch detection operation.

The scanning pulse voltage generation circuit 103 generates and outputs the scanning pulse voltage ($V_{TX}$) for driving the scanning electrodes Tx1 to Tx8.

The decoder circuit 106 is an analog switch (demultiplexer) that outputs the scanning pulse voltage ($V_{TX}$) to one of the scanning electrodes Tx1 to Tx8 based on the selector signal input from the sequencer 102.

The detection circuit 108 detects an inter-electrode capacitance (mutual capacitance, cross-over capacitance) Cxy at the intersection between one of the scanning electrodes Tx1 to Tx8, to which the scanning pulse voltage ($V_{TX}$) is supplied, and the respective detection electrodes Rx1 to Rx6.

The sequencer 102 controls the scanning pulse voltage generation circuit 103 to supply the scanning pulse voltage ($V_{TX}$) to the scanning electrodes Tx1 to Tx8 sequentially in synchronous with the vertical synchronous signal (Vsync) and the horizontal synchronous signal (Hsync). As FIGS. 3 and 4 show, the scanning pulse voltage ($V_{TX}$) is supplied to the respective scanning electrodes Tx1 to Tx8 a plurality of times. FIG. 4 represents that the scanning pulse voltage (VT) is supplied only 8 times for the purpose of avoiding complexity of the figure. It is preferable to supply the scanning pulse voltage ($V_{TX}$) 20 to 40 times, which is not limited.

As FIG. 4 shows, the detection circuit 108 integrates the current flowing to the respective detection electrodes Rx1 to Rx6 (integration toward the negative direction shown in FIG. 4), and records the arrival voltage value ($\Delta Va$, $\Delta Vb$)

If the finger (conductor) touches the point around the intersection between the scanning electrode Tx and the detection electrode Rx, the current flows to the finger, thus changing the voltage value as the integrated result.

For example, referring to NA of FIG. 4, if the finger does not exist at the point around the intersection between the scanning electrode Tx1 and the detection electrode Rx1, the voltage ($\Delta Va$) derived from integrating the current flowing to the detection electrode Rx1 is at the untouched level LA.

Meanwhile, referring to NB of FIG. 4, if the finger exists (touched state) at the point around the intersection between the scanning electrode Tx2 and the detection electrode Rx1, the current flows to the finger. The voltage ($\Delta Vb$) derived from integrating the current flowing to the detection electrode Rx1 has the potential higher than that of the untouched level LA by $V_{ST}$. The amount of change (touch signal) allows detection of the touched position (coordinates).

Referring to FIGS. 5 and 6, the operation of the detection circuit 108 during mutual detection will be described. The code TX of FIG. 6 denotes the scanning electrode Tx.

The detection circuit 108 includes an integration circuit 10, a sample hold circuit 11, a 10-bit AD converter (ADC) 12, a memory (RAM) 13 for storing data (referred to as RAW data) output from the AD converter 12, a memory (RAM) 14 for storing calibration data, an 8-bit DA converter (DAC) 15, and a microcomputer (MPU) 16. The integration circuit 10 includes a switch S1, an integration capacitance Cint and an operational amplifier. The sample hold circuit 11 includes a switch S4, a capacitance Csh and an operational amplifier. The detection circuit 108 further includes a calibration capacitance Cc1b, and switches S2, S3, S5 and S6. The switch S1 is a general term representing n switches including S1_Rx1 to S1_Rxn. This applies to the switches S2, S3, S4, S5 and S6.

(1) Reset of Detection Electrode and Integration Circuit (Period A1 of FIG. 6)

The switches S2 and S4 are turned OFF before detection (integration) of the current flowing to the respective detection electrodes Rx1 to Rxn. Then the switch S1 is turned ON to reset the integration circuit 10, and the switch S3 is turned ON to reset the respective detection electrodes Rx1 to Rxn.

The reference voltage ($V_{REF}$) is set to 4V ($V_{REF}$=4V) so that the integration circuit 10 outputs 4V, and the detection electrodes Rx1 to Rxn are precharged to 4V, respectively.

The switch S5 is connected to the reference voltage ($V_{OFSC}$) side, and the reference voltage ($V_{OFSC}$) of 4V is applied to both ends of the calibration capacitance Cc1b. The calibration capacitance Cc1b has the charge set to "0".

(2) Integration (Period B1 of FIG. 6)

Then after turning OFF the switches S1 and S3, the scanning pulse voltage ($V_{TX}$) is output to one of the scanning electrodes Tx1 to Txm to change over the switch S5 to the DA converter 15. The calibration voltage ($V_{DAC}$) output from the DA converter 15 is applied to one end of the calibration capacitance Cc1b. After extracting the charge, the switch S2 is turned ON to integrate the remaining charge with the integration capacitance Cint.

As a result, the current flows to one of the scanning electrodes Tx1 to Txm through the path of the cross-over capacitance Cxy and the integration capacitance Cint, and the output voltage ($V_{INT}$) of the integration circuit 10 is reduced. The $V_{INT}$ is expressed by the following formula:

$$V_{INT}=V_{REF}-(V_{TX}*C_{XY}-V_{CLB}*C_{CLB})/C_{INT}$$

where $C_{XY}$ denotes the capacitance value of the cross-over capacitance Cxy, $C_{CLB}$ denotes the capacitance value of the calibration capacitance Cc1b, and $C_{INT}$ denotes the capacitance value of the integration capacitance Cint. The charge of the integration capacitance Cint is derived from extracting the charge of the calibration capacitance Cc1b from the charge of the cross-over capacitance Cxy.

(3) Reset of Detection Electrode (Period A2 of FIG. 6)

After completion of integration by the integration circuit 10, the switch S2 is turned OFF and the switch S3 is turned ON. The switch S5 is connected to the reference voltage ($V_{OFSC}$) side to pre-charge the respective detection electrodes Rx1 to Rxn to 4V, and to set the charge of the calibration capacitance Cc1b to "0".

(4) The integration by the integration circuit 10 in the above-described process step (2) is repeated to accumulate the voltage (periods B2 to Bn of FIG. 6).

(5) Sample & Hold (Period C of FIG. 6)

After completion of integration by the integration circuit 10 (after the period Bn of FIG. 6), the switch S4 is turned ON to conduct sample & hold through the sample hold circuit 11. Then the switch S6 is sequentially turned ON to allow the AD converter 12 to conduct AD conversion so as to store the RAW data corresponding to the scanning electrodes Rx1 to Rxn into the memory (RAM) 13.

If the AD converter 12 is the 10-bit AD converter, the RAW data are in the range from 0 (integral 0V) to 1023 (integral 4V).

(6) Process steps described in (1) to (5) are sequentially executed with respect to all the scanning electrodes Tx1 to Txm so as to store the RAW data corresponding to the single plane of the intersections between the scanning electrodes Tx1 to Txm and the detection electrodes Rx1 to Rxn in the memory 13.

(7) The capacitance value of the cross-over capacitance Cxy in the untouched state is higher than the one in the touched state. As ΔVa, ΔVb of FIG. 4 show, the drop in the integration output voltages ($V_{INT}$) derived from the integration circuit 10 varies depending on the aforementioned states. Then threshold values are set to detect the touched position.

The calibration will be described.

As described above, each cross-over capacitance Cxy between the scanning electrodes Tx1 to Txm and the detection electrodes Rx1 to Rxn varies owing to individual difference or in-surface ununiformity resulting from variability or unevenness in the dielectric constant and thickness of the liquid crystal layer, glass substrate, polarizing plate, adhesive resin and the like. It is, therefore, essential to conduct the calibration.

(1) Assuming that the RAW data operation point in the untouched state is set to 255, the microcomputer (MPU) 16 rewrites the calibration data in the memory (RAM) 14, taking such point as the calibration target value while varying the calibration voltage ($V_{DAC}$) output from the DA converter 15 for convergence.

The RAW data operation point in the untouched state obviously represents those derived from sampling and holding the integration output voltage ($V_{INT}$) of the integration circuit 10 in the untouched state through the sample hold circuit 11, and AD conversion through the 10-bit AD converter 12.

(2) The calibration is performed by only moving the operation point without influencing the detection sensitivity. The detection sensitivity is expressed by the following formula that contains no calibration voltage ($V_{DAC}$).

$$\text{Detection sensitivity}=(\Delta C_{XY}/C_{INT})*V_{TX}$$

$$\Delta C_{XY}=C_{XY\_UT}-C_{XY\_T}$$

where $C_{XY\_UT}$ denotes the capacitance value of the cross-over capacitance $C_{XY}$ in the untouched state, and $C_{XY\_T}$ denotes the capacitance value of the cross-over capacitance $C_{XY}$ in the touched state.

Generally, the capacitance value ($C_{CLB}$) of the calibration capacitance Cc1b is determined so that the general calibration range is set to the voltage to the value around [8'h80] in the case of 8 bits, that is, around the intermediate section between the reference voltage ($V_{REF}$=4V) and GND (0V). Generally, the calibration capacitance Cc1b uses the coupling capacity of the diode-connected MOS transistor. Therefore, increase or decrease in the capacitance value ($C_{CLB}$) of the calibration capacitance Cc1b is adjusted in accordance with the number of the diode-connected MOS transistors which are connected in parallel.

Each timing upon touch panel detection and pixel writing in the division V blank drive will be described referring to FIGS. 7A and 7B.

The single vertical period (1V period) or the period for displaying the single frame is divided into the period for which the video signal and scanning signal (Sig) are driven (display period block 71) and the period for which the scanning pulse voltage ($V_{TX}$) of the touch panel is driven (touch period block 72), which are alternately driven. This is referred to as the division V blank drive. The single frame display period includes N display period blocks (Display) 71 and N touch period blocks (Touch) 72. In the single display period block, for example, 1280/N lines are scanned, and in the single touch period block, 20/M scanning electrodes (common electrodes) are scanned. For example, assuming that N=20 and M=20 are set, 64 lines are scanned for the single display period block, and one scanning electrode is scanned for the single touch period block. The scanning pulse voltage is applied to the single scanning electrode 20 to 40 times. In this case, the M is a natural number, which may be either larger or smaller than N. In order to increase the number of the touch detections for the single vertical period (for example, 4 times), setting of N=20 and M=5 makes it possible to perform the touch detection 4 times for the single vertical period with all the common electrodes 21, thus improving detection accuracy. In order to decrease the number of the touch detections for the single vertical period (for example, ½ times, that is, one time for 2 vertical periods), setting of N=20, M=40 allows the single touch detection with all the common electrodes 21 for the two vertical periods. This makes it possible to reduce the power consumption. The values of N and M are determined by setting the value from a host controller 200 to the register of the drive circuit 101 shown in FIG. 8 to be described later.

As FIGS. 7A and 7B show, the common electrode functions as the scanning electrode Tx. The scanning operation upon the touch panel detection is performed in the period for which the gate scan for writing the pixel is not performed. The parasitic capacitance exists between the video signal line 8 and the common electrode 21, and the scanning signal line 7 and the common electrode 21. The detection level upon touch panel detection varies with fluctuation of the voltage ($V_{DL}$) on the video signal line 8, and noise at the start or falling of the voltage ($V_{GL}$) on the scanning signal line 7, thus deteriorating the coordinate precision. Accordingly, it is necessary to perform the touched position detection in the period for which the voltage ($V_{DL}$) on the video signal line 8 does not fluctuate, or the voltage ($V_{GL}$) on the scanning signal line 7 does not rise or fall. The division V blank drive may be conducted in the period for which the voltage ($V_{DL}$) on the video signal line 8 does not fluctuate, or the voltage ($V_{GL}$) on the scanning signal line 7 does not start or fall. Assuming that the single frame period for which the video signal and the scanning signal (Sig) are driven exists only once in the single frame period, and the period for which the scanning pulse voltage ($V_{TX}$) of the touch panel exists only once, it is necessary to retain the prolonged drive period of the scanning pulse voltage. There may be the case where it is difficult to do the aforementioned setting because of limited blanking period assigned for the single frame. The division V blank drive may avoid the aforementioned difficulty.

<Pseudo Mutual Detection>

The touch panel function in the display stop state (pseudo mutual detection, second mutual detection) will be described referring to FIGS. 8 to 12B. The pseudo mutual detection is executed by detecting capacitance change between the detection electrodes using the detection electrode only at the counter substrate side in the display stop state so that the touch or the horizontal movement is detected. The horizontal movement (swipe detection) is performed by detecting the movement in the direction (lateral direction) perpendicular to the longitudinal direction of the detection electrode. In the display stop state, the common electrode is not used for display nor touch detection. The state where the common electrode is not used for the display or the touch detection refers to the second mode. The low power consumption mode (referred to as "sleep mode") in which the display operation and any other operation for stopping unnecessary circuits is the second mode. The backlight is turned off in the sleep mode.

Figure 8:
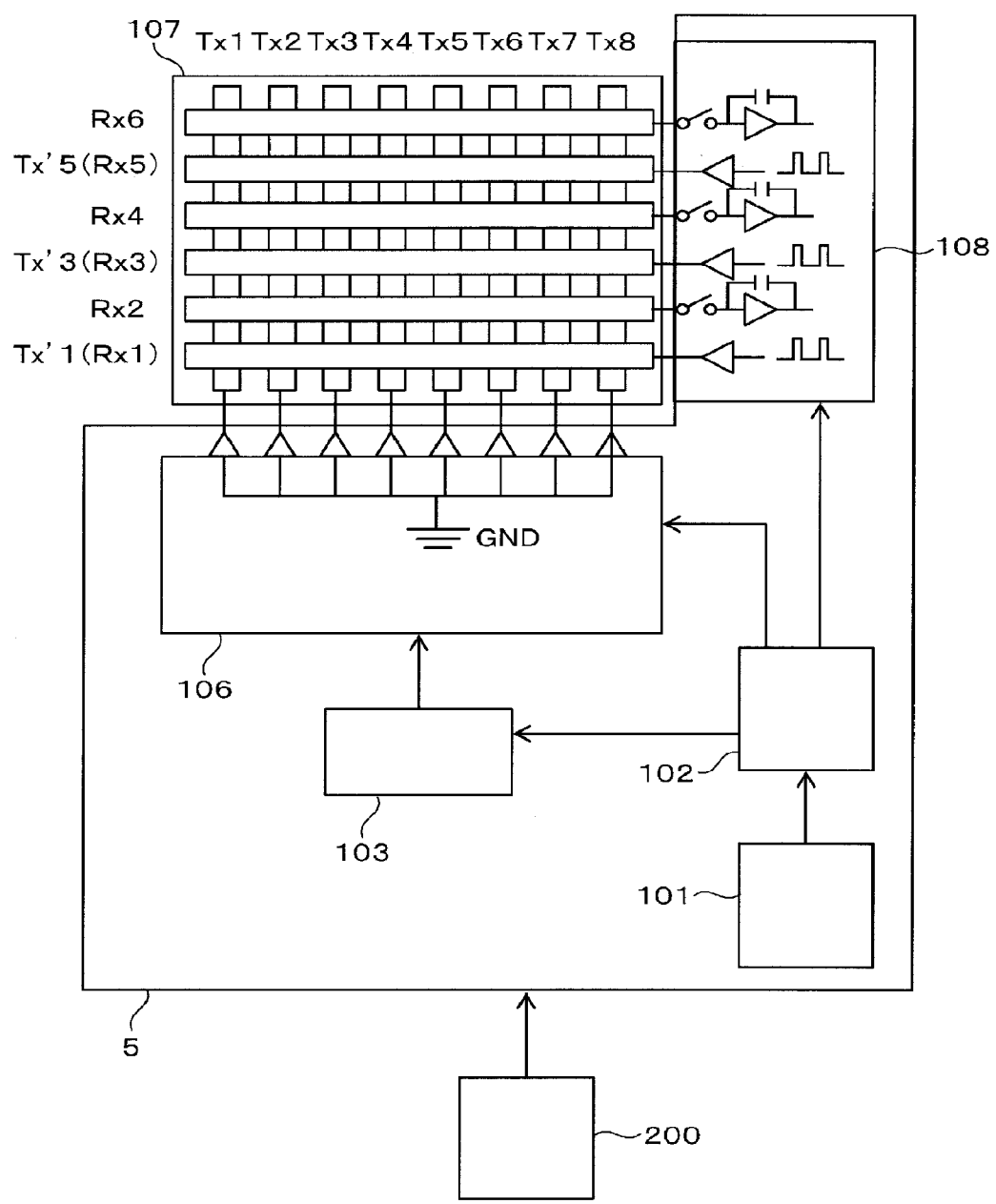
FIG. 8 is a block diagram schematically showing an entire structure of the touch panel of the display device in the display stop state according to the first embodiment.
Figure 9A:
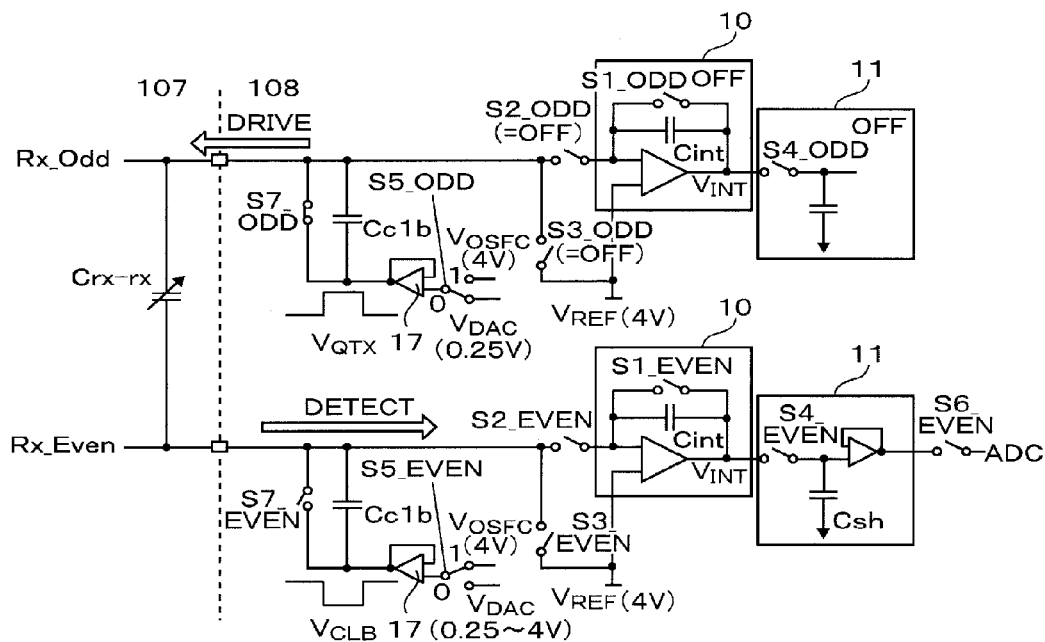
FIG. 9A is an explanatory view of an operation of the detection circuit in the display stop state according to the first embodiment.
Figure 9B:
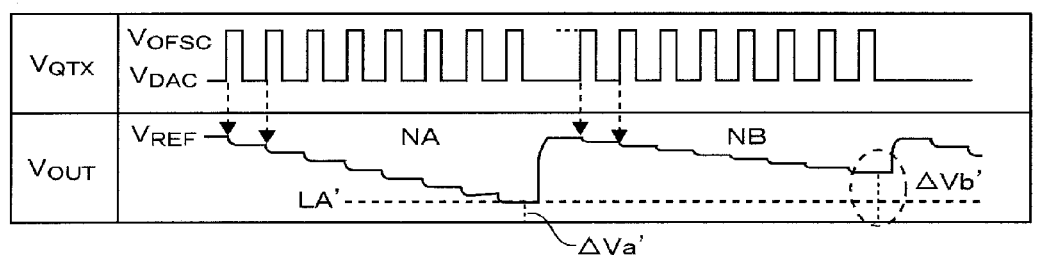
FIG. 9B is a timing chart of the touch detection operation on the touch panel, which is performed by the detection circuit in the display stop state according to the first embodiment.
Figure 11:
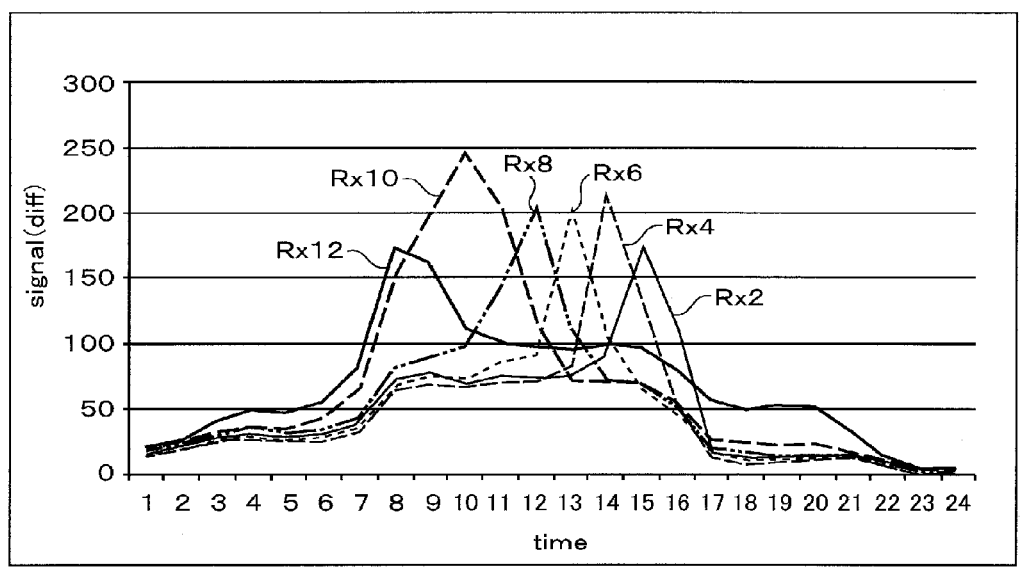
FIG. 11 is a view representing change in the touch signal resulting from the swiping operation in the detection circuit according to the first embodiment.
Figure 12A:
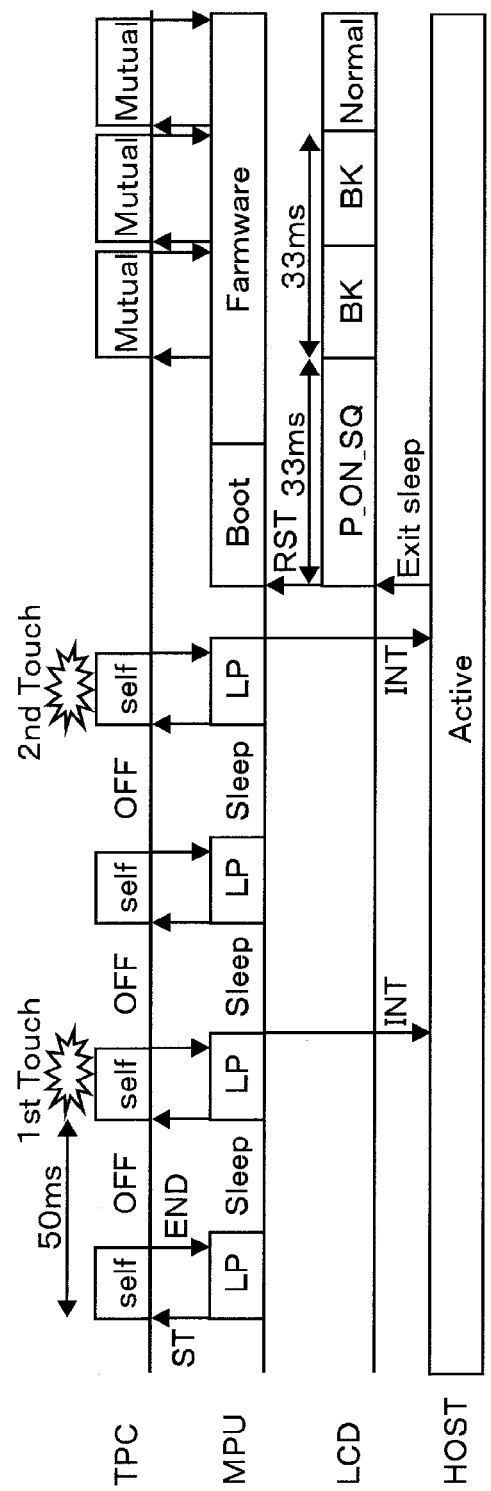
FIG. 12A is an explanatory view representing an operation for starting the display device through the single touch or double touch according to the first embodiment.
Figure 12B:
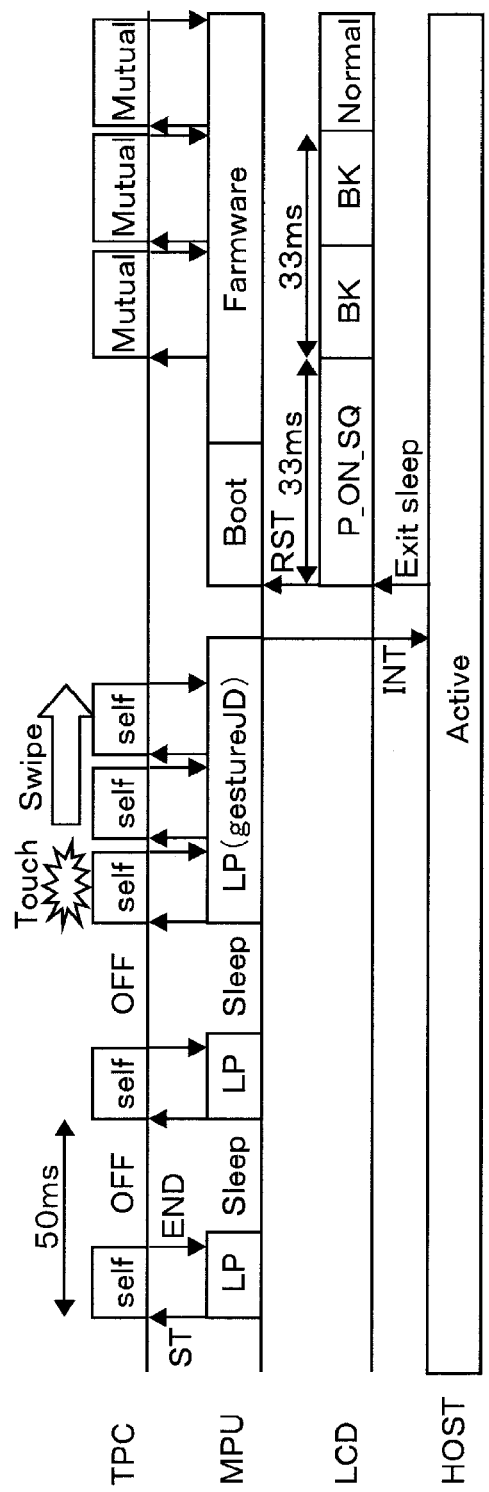
FIG. 12B is an explanatory view representing the operation for starting the display device through the swipe according to the first embodiment.

FIG. 8 is a block diagram schematically showing an entire structure of the touch panel of the display device in the display stop state according to the first embodiment. FIG. 9A is an explanatory view of an operation of the detection circuit in the display stop state according to the first embodiment. FIG. 9B is a timing chart of the operation for detecting the touch on the touch panel by the detection circuit in the display stop state according to the first embodiment. FIG. 9C represents the reference voltage set register of the detection circuit according to the first embodiment. FIG. 9D is a view representing the relationship between the calibration voltage and the memory data of the detection circuit according to the first embodiment. FIG. 10 represents each timing of signals of the detection circuit in the display stop state according to the first embodiment. FIG. 11 is a view showing change in the touch signal of the detection circuit resulting from the swiping operation according to the first embodiment. FIG. 12A is an explanatory view representing start-up of the display device according to the first embodiment through the single touch or double touch. FIG. 12B is an explanatory view representing start-up of the display device through the swipe according to the first embodiment.

Referring to FIG. 8, in the display stop state, the every other detection electrode Rx of those of the touch panel is allowed to function as the temporary scanning electrode T'x so that the detection circuit 108 outputs the scanning pulse voltage ($B_{QTX}$) to the virtual scanning electrode T'x. Referring to FIG. 8, the detection electrodes Rx1, Rx3 and Rx5 are allowed to function as the temporary scanning electrodes T'x1, T'x2 and T'x3, respectively. In other words, the odd-numbered detection electrodes Rx_Odd are allowed to operate as the temporary scanning electrodes T'x. In the display stop state, the scanning electrode Tx (common electrode 21) is fixed to the GND potential.

Upon transition of the display device 100 from the display state to the display stop state, the host controller 200 sets the predetermined data to the register in the driver IC 5 so as to turn OFF the switch S2_ODD connected to the temporary scanning electrode T'x (odd-numbered detection electrode Rx_Odd), and turn OFF the integration circuit 10 and the sample hold circuit 11 connected to the switch S2_ODD. In this case, the integration circuit 10 and the sample hold circuit 11 are turned OFF in order to prevent the through-current from flowing by fixing each node of the integration circuit 10 and the sample hold circuit 11 to the reference potential (reference voltage or GND). Similarly, the switch S7_ODD is turned ON sequentially in accordance with the predetermined data set in the register within the driver IC 5 to supply the scanning pulse voltage ($V_{QTX}$) to the temporary scanning electrode T'x in sequence. In this case, the scanning pulse voltage ($V_{PTX}$) is supplied to the temporary scanning electrode T'x a plurality of times (for example, 64 times; 6 µs for the single supply).

Likewise the display state as described referring to FIG. 4, the even-numbered integration circuit 10 connected to the switch S2_EVEN integrates the current flowing to the even-numbered detection electrodes Rx_Even (integration toward the negative direction in this embodiment), and records the arrival voltage value ($\Delta Va', \Delta Vb'$).

If the finger (conductor) touches the even-numbered detection electrode Rx_Even and the temporary scanning electrode T'x (odd-numbered detection electrode Rx_Odd), or the finger (conductor) is in the vicinity of the even-numbered detection electrode Rx_Even and the temporary scanning electrodes T'x1, T'x2 and T'x3, the current flows to the finger. Therefore, this varies the voltage value as a result of integrating the current flowing to the respective even-numbered detection electrodes Rx2, Rx4 and Rx6.

If the finger is not in the vicinity of the even-numbered detection electrodes Rx2, Rx4, Rx6, and the temporary scanning electrodes T'x1, T'x2, T'x3, the voltage ($\Delta Va'$) as a result of integrating the current flowing to the detection electrode is brought into the untouched level LA' as NA of FIG. 9B shows.

Meanwhile, if the finger touches the even-numbered detection electrodes Rx2, Rx4, Rx6 and the temporary scanning electrodes T'x1, T'x2, T'x3, the current flows to the finger. Then the voltage ($\Delta Vb'$) as a result of integrating the current flowing to the even-numbered detection electrodes Rx2, Rx4, Rx6 has the potential higher than the one at the untouched level LA'. The resultant change (touch signal) allows detection of existence of the touch or the swipe.

The operation of the detection circuit 108 during the pseudo mutual detection will be described referring to FIGS. 9A, 9C, 9D and 10.

The detection circuit 108 includes the integration circuit 10, the sample hold circuit 11 and the calibration amplifier 17. The calibration amplifier 17 receives the supply of a voltage ($V_{OFSC}$) based on the reference voltage in the set register (TPC_VOFSCTX) shown in FIG. 9C or the output voltage (calibration voltage ($V_{DAC}$)) of the DA converter 15 based on the calibration data (CLB_DATA) stored in the memory 14 as shown in FIG. 9C.

(1) Reset of Detection Electrode and Integration Circuit (Period A1 of FIG. 10)

The switches S2_ODD and S3_ODD are turned OFF, and the switch S7_ODD is turned ON to allow the use of the detection electrode Rx_Odd as the temporary scanning electrode T'x. The switch S5_ODD is connected to the $V_{DAC}$ side ($V_{DAC}$=0.25V), and outputs the scanning pulse voltage ($V_{QXT}$=0.25V) so that the detection electrode Rx_Odd is reset to 0.25V. In this case, the switch S1_ODD is a general term representing the switches connected to the odd-numbered detection electrodes Rx_Odd of the switches S1_Rx1, S1_Rx3, S1_Rx5, respectively. This applies to the switches S2_ODD, S3_ODD, S4_ODD, S5_ODD, S6_ODD and S7_ODD.

Before detecting (integrating) the current flowing to the respective detection electrodes Rx_Even, the switches S2_EVEN, S4_EVEN, S7_EVEN are turned OFF, and the switch S1_EVEN is turned ON to reset the integration circuit 10. At the same time, the switch S3_EVEN is turned ON to reset the respective detection electrodes Rx_Even. In this case, the switch S1_EVEN is the general term representing the switches connected to the even-numbered detection electrodes Rx_Even of the switches S1_Rx2, S1_Rx4, S1_Rx6. This applies to the switches S2_EVEN, S3_EVEN, S4_EVEN, S5_EVEN, S6_EVEN and S7_EVEN.

Assuming that the reference voltage ($V_{REF}$) is set to 4V ($V_{REF}$=4V), the integration circuit 10 outputs 4V, and the detection electrode Rx_Even is precharged to 4V.

The switch S5_EVEN is connected to the $V_{OFSC}$ side ($V_{OFSC}$=4V), and the voltage of 4V is applied to both ends of the calibration capacitance Cc1b. Therefore, the calibration capacitance Cc1b has the charge set to "0".

(2) Integration (Term B1 of FIG. 10)

After turning OFF the switches S1_EVEN and S3_EVEN, the switch S5_ODD is connected to the $V_{OFSC}$ side ($V_{OFSC}$=4V) and outputs the scanning pulse voltage ($V_{QTX}$=4V) to the detection electrode Rx_Odd. The switch S5_EVEN is changed over to the $V_{DAC}$ side ($V_{DAC}$=0.25 to 4V), the calibration pulse voltage ($V_{CLB}$) is applied to one end of the calibration capacitance Cc1b, and the charge of the cross-over capacitance Cxy is extracted. Then the switch S2_EVEN is turned ON to integrate the remaining charge with the integration capacitance Cint.

As a result, the current flows to one of the detection electrodes Rx_Even through the path of the detection capacitance Crx-rx and the integration capacitance Cint so that the output voltage ($V_{INT}$) of the integration circuit 10 is lowered.

(3) Reset of Detection Electrode (Period A2 of FIG. 10)

After completion of integration by the integration circuit 10, the switch S5_ODD is connected to the $V_{DAC}$ side ($V_{DAC}$=0.25V), and outputs the scanning pulse voltage ($V_{TX}$=0.25V). The detection electrode Rx_Odd is reset to 0.25V. The switch S5_EVEN is connected to the $V_{OFSC}$ side ($V_{OFSC}$=4V) while turning OFF the switch S2_EVEN and turning ON the switch S3_EVEN. Then the detection electrode Rx_Even is precharged to 4V, and the charge of the calibration capacitance Cc1b is set to "0".

(4) The integration by the integration circuit 10 as described in the process step (2) is repeated to accumulate the voltage (periods B2, . . . Bn of FIG. 10).

(5) Sample & Hold (Period C of FIG. 10)

After completion of integration by the integration circuit 10 (after the period Bn of FIG. 10), the switch S4_EVEN is turned ON to conduct sample and hold by the sample hold circuit 11. Thereafter, the switch S6_EVEN is sequentially turned ON so that the AD conversion is performed by the AD converter 12. The RAW data corresponding to the even-numbered detection electrodes Rx_Even are stored in the memory (RAM) 13.

If the AD converter 12 is the 10-bit AD converter, the RAW data are in the range from 0 (integral 0V) to 1023 (integral 4V).

(6) The above-described process steps (1) to (5) are executed sequentially with respect to all the even-numbered detection electrodes Rx_Even so as to store the RAW data corresponding to adjacent single plane of the even-numbered detection electrodes Rx_Even and the odd-numbered detection electrodes Rx_Odd in the memory 13.

(7) As the capacitance value of the detection capacitance Crx-rx in the untouched state is larger than the one in the touched state, the drop in the output voltages ($V_{INT}$) through the integration circuit 10 varies depending on the above-described state. Then threshold values are set to detect existence of the touch or the swipe.

FIG. 11 represents the signal values (difference between ΔVb' and ΔVa') obtained by the swipe from the detection electrode Rx12 in the direction of the detection electrode Rx2. The single X-axis scale of time represents the cycle of the touch detection process.

As FIGS. 12A and 12B show, the microcomputer (MPU) 16 in the driver IC 5 allows the touch panel (TPC) 107 to have a pseudo mutual (self) operation (ST) in the display stop state while looping during such period (LP). Upon detection of completion (END) of the pseudo mutual (self) operation, the microcomputer 16 is brought into the sleep mode (Sleep). In the sleep mode, the timer counter is only operated. After the elapse of a predetermined time, the microcomputer 16 executes the touch detection process for detecting existence of the subsequent touch or swipe. Preferably, the microcomputer 16 executes the touch detection process at the cycle of 50 ms, for example.

As FIG. 12A shows, in the case where the device is started through the single touch, when the touch is detected once, the microcomputer 16 outputs an interruption signal (INT) to the host controller (HOST) 200. In the case where the device is started through the double touch, when the touch is detected twice, the microcomputer 16 outputs the interruption signal (INT) to the host controller 200.

Upon the double-touch start-up, in response to reception of the interruption signal (INT) twice, the host controller 200 inputs a sleep mode release signal (Exit sleep) to the display device 100 to release the sleep mode of the display device. The drive circuit 101 of the display device 100 is brought into the display state (BK, Normal) through the power-on-sequence (P_ON_SQ). The drive circuit 101 generates an internal reset signal (RST) so as to be input to the microcomputer 16. The microcomputer 16 executes the boot process (Boot) to allow the touch panel (TPC) 107 to activate the mutual (Mutual) operation so that the touch detection process (Farmware) is executed. In the case where the interruption signal (INT) is received once, and another interruption signal (INT) is not received within a predetermined period (for example, 1 second) after the first reception, the display device 100 is configured not to display.

In the case of the single-touch start-up, which is not shown, upon reception of the interruption signal (INT) once, the host controller 200 inputs the sleep mode release signal (Exit sleep) to the display device 100 to release the sleep mode of the display device. The drive circuit 101 of the display device 100 is brought into the display state (BK, Normal) through the power-on-sequence (P_ON_SQ). The drive circuit 101 generates the internal reset signal (RST) so as to be input to the microcomputer 16. The microcomputer 16 executes the boot process (Boot) to allow the touch panel (TPC) 107 to activate the mutual (Mutual) operation so that the touch detection process (Farmware) is executed.

As FIG. 12B shows, in the case of the swipe start-up, upon detection of the touch once, the microcomputer 16 detects the successive touch operations without making transition to the sleep mode so as to determine whether the movement (swipe) has occurred (gesture determination). Upon detection of the swipe, the microcomputer 16 outputs the interruption signal (INT) to the host controller 200. The successive touch operation, that is, touch operations while shifting the touched positions is detected within a predetermined period of time (for example, within 50 ms). The predetermined period of time is far shorter than the predetermined time taken for the single touch start-up. The microcomputer 16 has the loop for the gesture determination longer than any other loop (LP) as the gesture is determined after the single touch detection.

Referring to FIGS. 12A and 12B, upon reception of the interruption signal (INT), the host controller 200 inputs the sleep mode release signal (Exit sleep) to the display device 100 to release the sleep mode of the display device. The drive circuit of the display device 100 is brought into the display state (BK, Normal) through the power-on-sequence (P_ON_SQ). The drive circuit generates the internal reset signal (RST) so as to be input to the microcomputer 16. The microcomputer 16 executes the boot process (Boot) to allow the touch panel (TPC) 107 to activate the mutual (Mutual) operation so that the touch detection process (Farmware) is executed.

As described above, the display device 100 according to the embodiment has the single touch start-up mode or the double touch start-up mode, and the swipe start-up mode. These modes are executed by the host controller 200 for writing the predetermined value to the register in the drive circuit 101 of the display device 100. In the sleep mode, the touch detection process is executed by using only the detection electrode Rx of the touch panel formed by dividing the backside transparent conducting film (CD) formed on the CF substrate 3 into the belt-like patterns. In the state where the display of the display panel is stopped, the scanning electrode Tx is not scanned. Therefore, the DC voltage is applied to the liquid crystal layer of the display panel, which makes it possible to prevent burning on the liquid crystal layer.

In this embodiment, the integration circuit 10 and the sample hold circuit 11 connected to the detection electrode Rx functioning as the temporary scanning electrode T'x are turned OFF in the sleep mode. As a result, the power consumed by the detection circuit may be reduced by half. It is possible to lessen the power consumption in the sleep mode.

Second Embodiment

The display device according to the second embodiment will be described referring to FIGS. 13 to 16.

Figure 13:
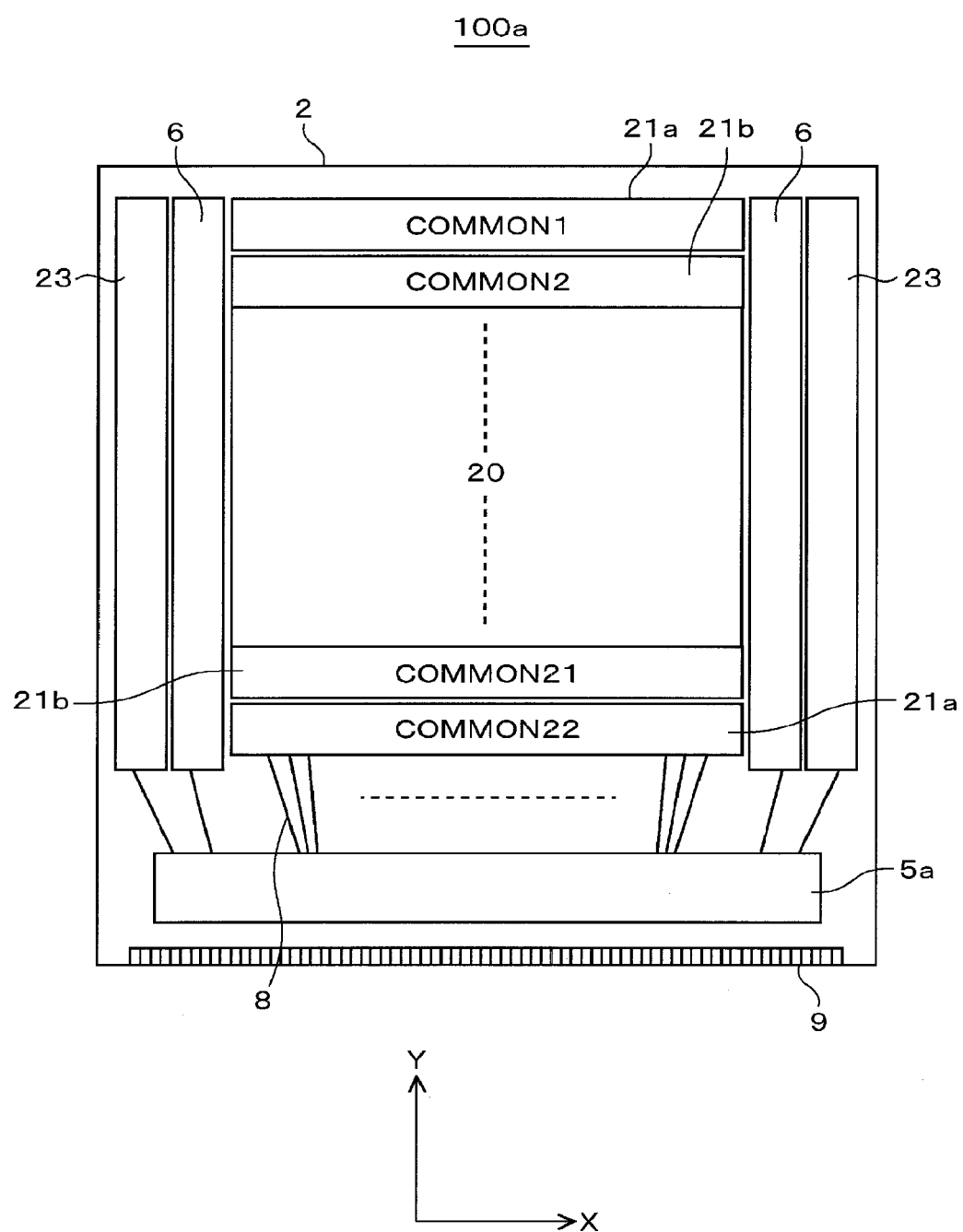
FIG. 13 is a plan view of the display device according to a second embodiment.

FIG. 13 is a plan view of the display device according to the second embodiment.

The display device according to the second embodiment is substantially the same as the display device according to the first embodiment except the structure inside the TFT substrate and the structure of the driver IC. A display device 100a according to the second embodiment includes two belt-like common electrodes (COMMON 1, COMMON 22) 21a, and 20 belt-like common electrodes (COMMON 2 to COMMON 21) 21b on the TFT substrate 2. The number of the common electrodes is increased compared with the case of the display device 100 according to the first embodiment. As a result, the number of the common electrode signal lines is increased as well as the width of the frame region. The display device 100a is configured to form the scan circuit (Tx scan circuit) 23 of the common electrode on the TFT substrate 2 likewise the gate scan circuit 6 so as not to increase the width of the frame region. Therefore, unlike the driver IC 5, the driver IC 5a has no Tx scan circuit. The single common electrode 21a is shared by the pixels corresponding to 60 lines, and the single common electrode 21b is shared by the pixels corresponding to 58 lines. The scanning pulse voltage in the pseudo mutual of the display device 100a has the polarity opposite the one of the scanning pulse voltage in the pseudo mutual of the display device 100. The display device 100a is the same as the display device 100 except the points as described above.

The difference between the display devices 100a and 100 will be described.

Figure 14A:
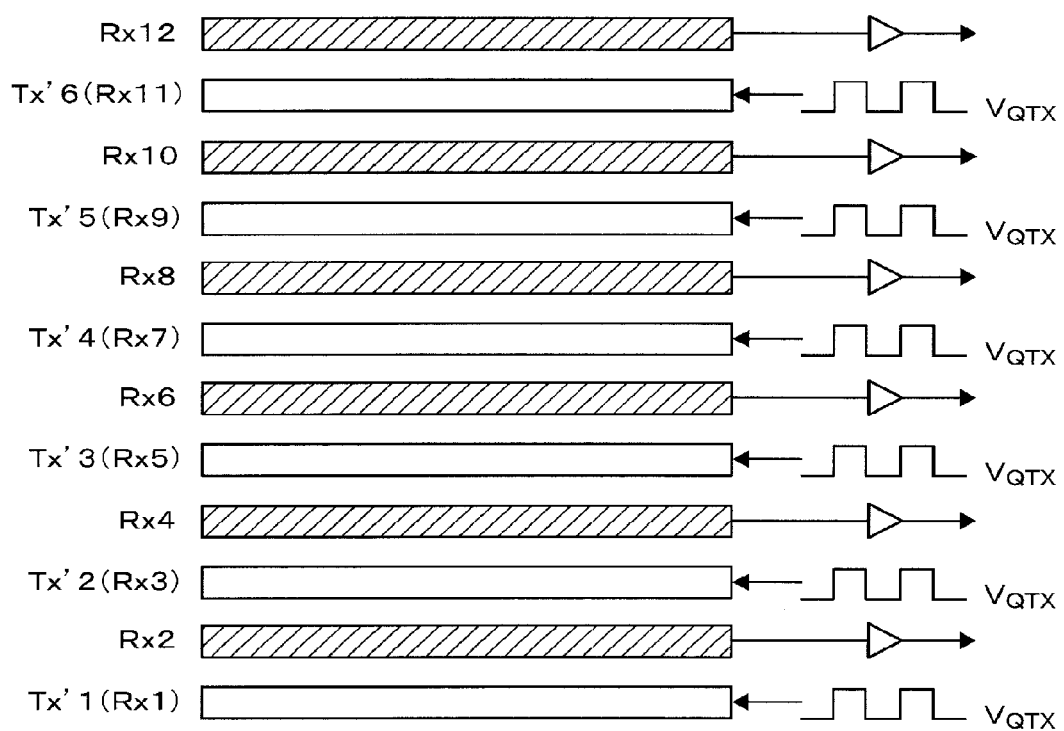
FIG. 14A is a schematic view representing a Tx in-phase drive mode according to the first embodiment.
Figure 14B:
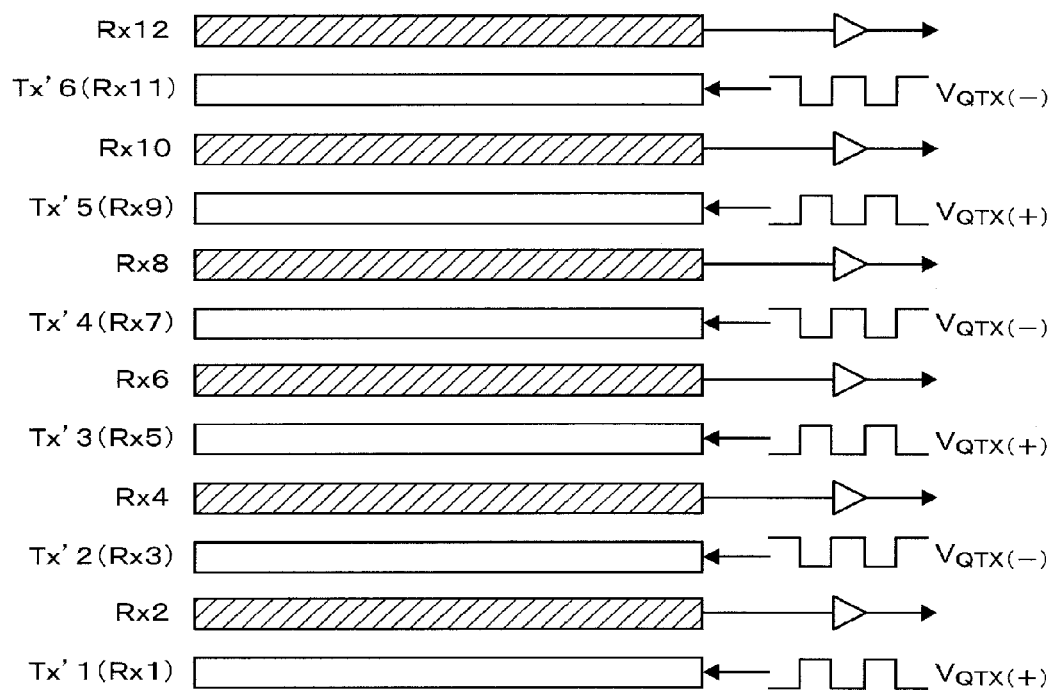
FIG. 14B is a schematic view representing a Tx differential drive mode (1) according to the second embodiment.
Figure 14C:
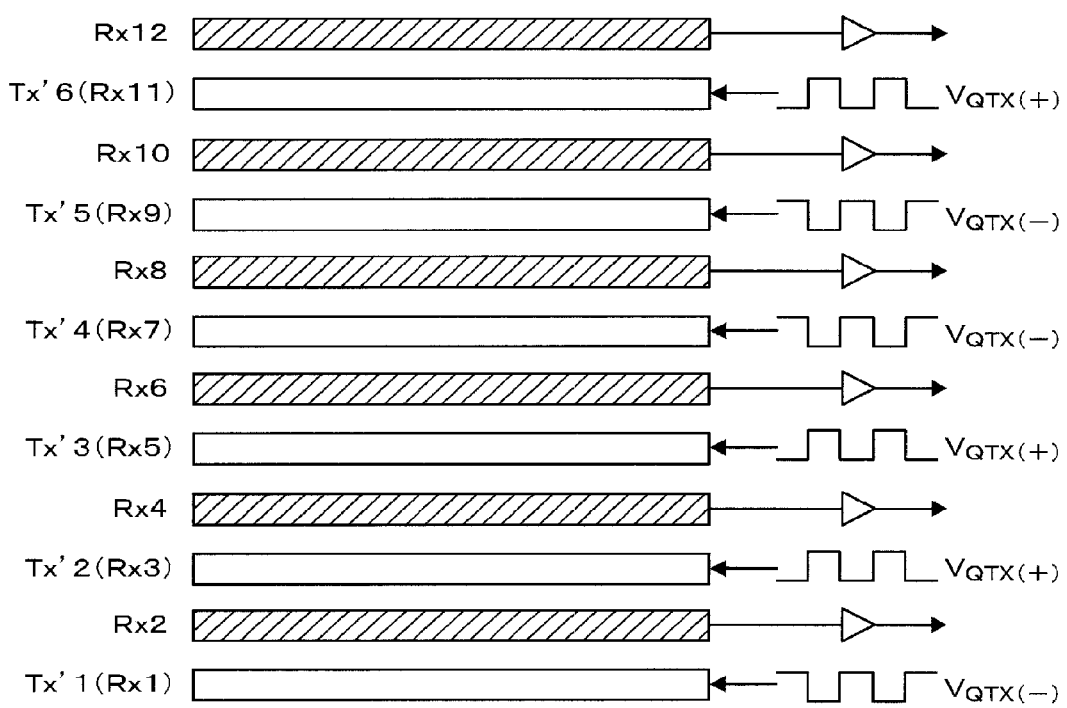
FIG. 14C is a schematic view representing a Tx differential drive mode (2) according to the second embodiment.
Figure 14D:
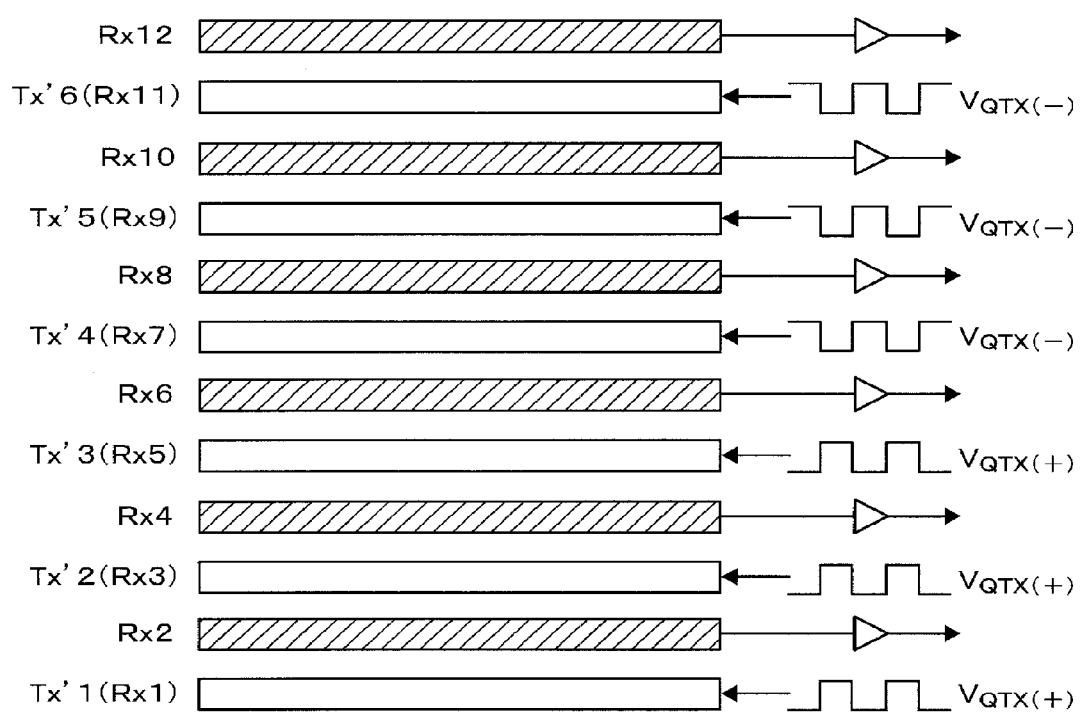
FIG. 14D is a schematic view representing a Tx differential drive mode (3) according to the second embodiment.

FIG. 14A schematically shows the in-phase drive Tx according to the first embodiment. FIG. 14B schematically shows the Tx differential drive (1) according to the second embodiment. FIG. 14C schematically shows the Tx differential drive (2) according to the second embodiment. FIG. 14D schematically shows the Tx differential drive (3) according to the second embodiment.

In the first embodiment as shown in FIG. 14A, the temporary scanning electrodes Tx' (detection electrodes Rx1, Rx3, Rx5, Rx7, Rx9, Rx11, that is, the odd-numbered detection electrodes Rx_Odd) are driven at the same polarity scanning pulse voltage ($V_{QTX}$) (for example, all with the positive polarity). The drive pattern as shown in FIG. 14A is referred to as the in-phase drive.

Meanwhile, in the second embodiment as shown in FIGS. 14B, 14C and 14D, the temporary scanning electrode Tx' (detection electrodes Rx1, Rx3, Rx5, Rx7, Rx9, Rx11, that is, the odd-numbered detection electrodes Rx_Odd) will be driven by the opposite polarity scanning pulse voltage ($V_{QTX}(+)$, $V_{QTX}(-)$). The drive pattern shown in FIGS. 14B, 14C and 14D is referred to as the differential drive.

As FIG. 14B shows, the detection electrodes Rx1, Rx5, Rx9 are driven by the positive polarity scanning pulse voltage ($V_{QTX}(+)$), and the detection electrodes Rx3, Rx7, Rx11 are driven by the negative polarity scanning pulse voltage ($V_{QTX}(-)$) in the case of the first Tx differential drive. In other words, the adjacent temporary scanning electrodes Tx' have different polarities.

In the second embodiment, as FIG. 14C shows, the detection electrodes Rx3, Rx5, Rx11 are driven by the positive polarity scanning pulse voltage ($V_{QTX}(+)$), and the detection electrodes Rx1, Rx7, Rx9 are driven by the negative polarity scanning pulse voltage ($V_{QTX}(-)$) in the case of the second Tx differential drive. In other words, two adjacent temporary scanning electrodes Tx' are driven by the positive polarity scanning pulse voltage ($V_{QTX}(+)$), and the next two adjacent temporary scanning electrodes Tx' are driven by the negative polarity scanning pulse voltage ($V_{QTX}$ (−)).

In the second embodiment, as FIG. 14D shows, the detection electrodes Rx1, Rx3, Rx5 are driven by the positive polarity scanning pulse voltage ($V_{QTX}$(+)), and the detection electrodes Rx7, Rx9, Rx11 are driven by the negative polarity scanning pulse voltage ($V_{QTX}$ (−)) in the case of the third Tx differential drive. In other words, half the adjacent temporary scanning electrodes Tx' are driven by the positive polarity scanning pulse voltage ($V_{QTX}$(+)), and the remaining half the adjacent temporary scanning electrodes Tx' are driven by the negative polarity scanning pulse voltage ($V_{QTX}$(−)).

The operation of the detection circuit 108a during the pseudo mutual detection will be described referring to FIGS. 15A and 15B.

Figure 15A:
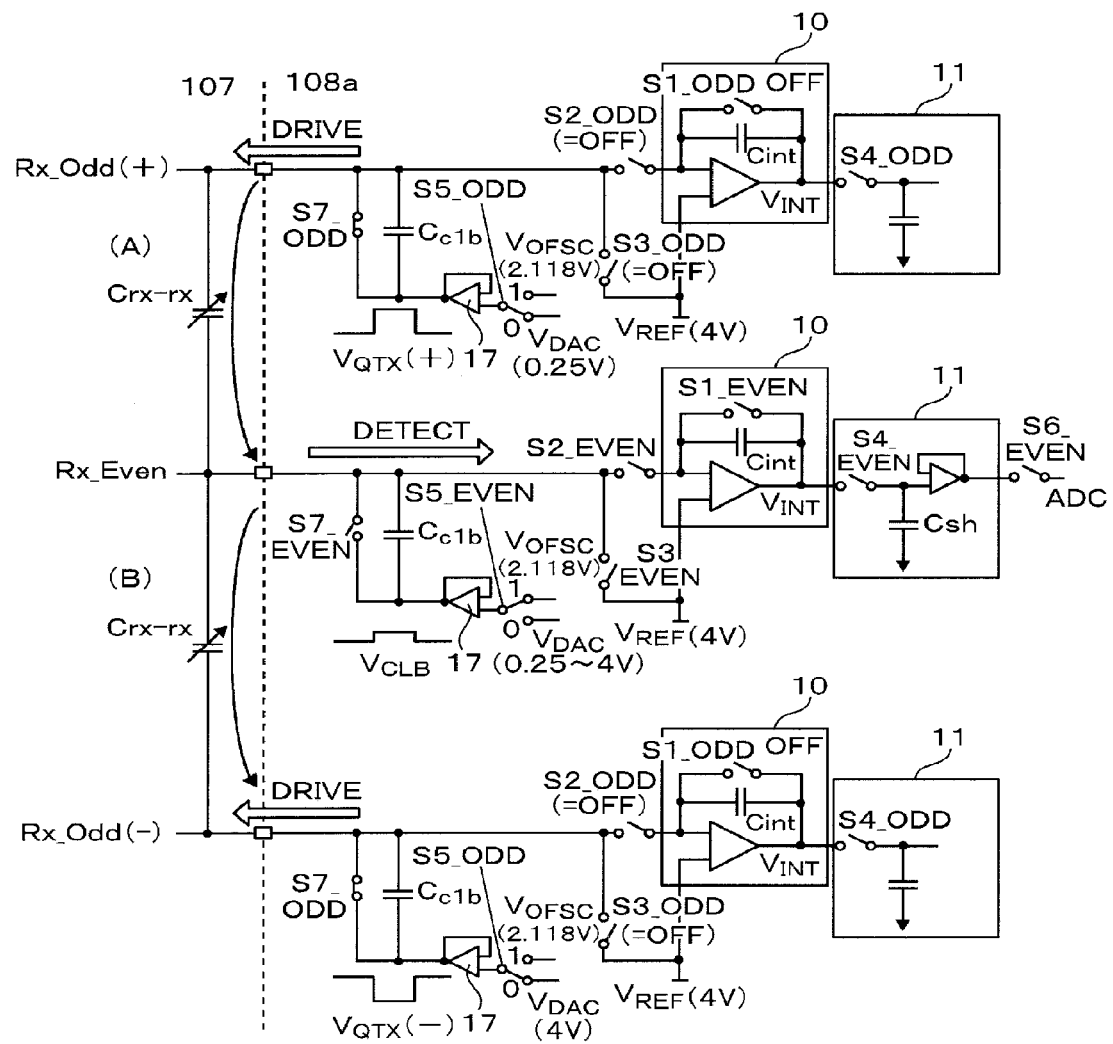
FIG. 15A is an explanatory view of an operation of the detection circuit in the display stop state according to the second embodiment.
Figure 15B:
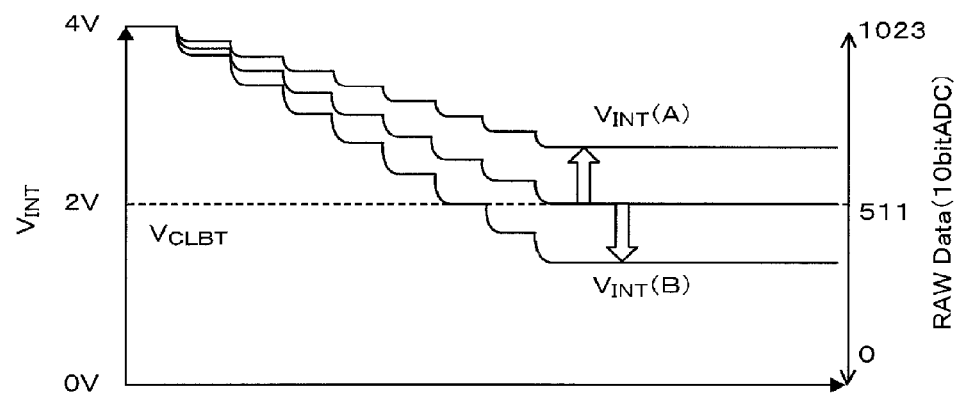
FIG. 15B is a timing chart of the touch detection on the touch panel by the detection circuit in the display stop state according to the second embodiment.
Figure 16:
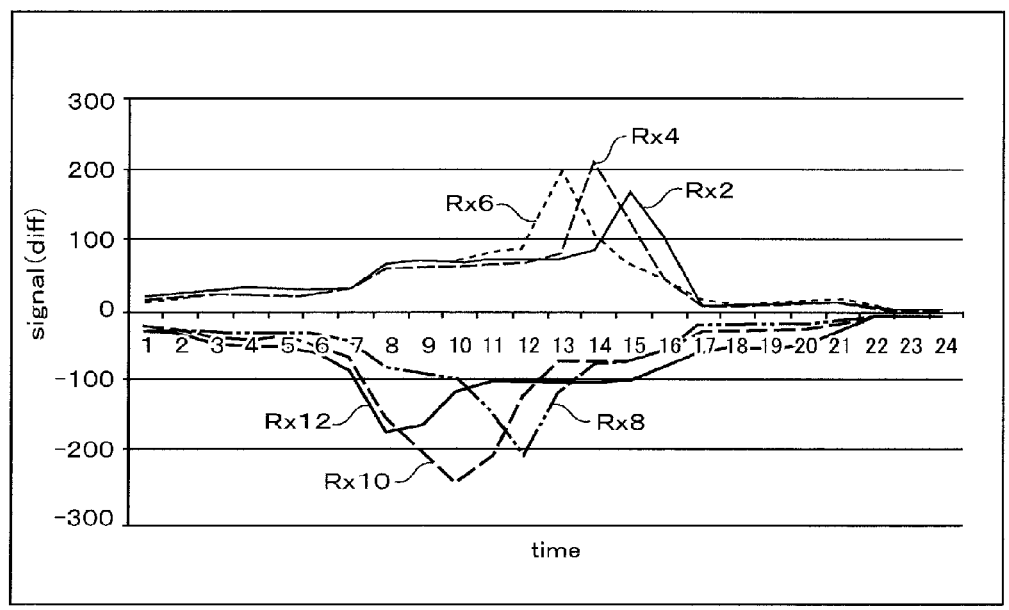
FIG. 16 is a view representing change in the touch signal resulting from the swiping operation in the detection circuit according to the second embodiment.

FIG. 15A is an explanatory view of the operation of the detection circuit in the display stop state according to the second embodiment. FIG. 15B is a timing chart representing detection of the touch on the touch panel in the display stop state of the detection circuit according to the second embodiment. FIG. 16 is a view representing the change in the touch signal of the detection circuit resulting from the swipe according to the second embodiment.

The detection circuit 108a according to the second embodiment has the same circuit structure as that of the detection circuit 108 according to the first embodiment. However, the voltage applied to the calibration amplifier 17 of the detection circuit 108a is different from the voltage applied to the calibration amplifier 17 of the detection circuit 108. In other words, the scanning pulse voltage ($V_{QTX}$) and the calibration pulse voltage ($V_{CLB}$) are different.

(1) Reset of Detection Electrode and Integration Circuit

The switches S2_ODD and S3_ODD are turned OFF, and the switch S7_ODD is turned ON so that the detection electrodes Rx_Odd (+) and Rx_Odd (−) are usable as the temporary scanning electrodes T'x. The switch S5_ODD corresponding to the detection electrode Rx_Odd (+) is connected to the $V_{DAC}$ side ($V_{DAC}$=0.25V), and outputs the scanning pulse voltage ($V_{QTX}$ (+)=0.25V). The detection electrode Rx_Odd is reset to 0.25V. The switch S5_ODD corresponding to the detection electrode Rx_Odd (−) is connected to the $V_{CLB}$ side ($V_{CLB}$=4V), and outputs the scanning pulse voltage ($V_{QTX}$(−)=4V). The detection electrode Rx_Odd is reset to 4V.

Before detecting (integrating) the current flowing to the detection electrode Rx_Even, the switches S2_EVEN, S4_EVEN, S7_EVEN are turned OFF, and the switch S1_EVEN is turned ON to reset the integration circuit 10. The switch S3_EVEN is further turned ON to reset the detection electrode Rx_Even.

When the reference voltage ($V_{REF}$) is set to 4V ($V_{REF}$=4V), the integration circuit 10 outputs 4V, and the detection electrode Rx_Even is precharged to 4V.

The switch S5_EVEN is connected to the $V_{OFSC}$ side ($V_{OFSC}$=2.118V), and the voltage derived from the formula of 4V−2.118V is applied to both ends of the calibration capacity Cc1b.

(2) Integration

After turning OFF the switches S1_EVEN and S3_EVEN, the switch S5_ODD corresponding to the detection electrode Rx_Odd (+) is connected to the $V_{OFSC}$ side ($V_{OFSC}$=2.118V), and outputs the scanning pulse voltage ($V_{QTX}$(+)=2.118V) to the detection electrode Rx_Odd (+). The switch S5_ODD corresponding to the detection electrode Rx_Odd (−) is connected to the $V_{OFCS}$ side ($V_{OFSC}$=2.118V), and outputs the scanning pulse voltage ($V_{QTX}$(−)=2.118V) to the detection electrode Rx_Odd (−). The switch S5_EVEN is changed over to the $V_{DAC}$ side ($V_{DAC}$=0.25 to 4V), and applies the calibration pulse voltage ($V_{CLB}$) to one end of the calibration capacitance Cc1b to extract the charge of the cross-over capacitance Cxy. Then the switch S2_EVEN is turned ON to integrate the remaining charge with the integration capacitance Cint.

As a result, the current flows to one of the detection electrodes Rx_Even through the path of the detection capacitance Crx-rx and the integration capacitance Cint so as to lower the output voltage ($V_{INT}$) of the integration circuit 10.

(3) Reset of Detection Electrode

After completion of the integration by the integration circuit 10, the switch S5_ODD corresponding to the detection electrode Rx_Odd (+) is connected to the $V_{DAC}$ side ($V_{DAC}$=0.25V), and outputs the scanning pulse voltage ($V_{QTX}$(+)=0.25V). The detection electrode Rx_Odd (+) is reset to 0.25V. The switch S5_ODD corresponding to the detection electrode Rx_Odd (−) is connected to the $V_{DAC}$ side ($V_{DAC}$=4V), and outputs the scanning pulse voltage ($V_{QTX}$(−)=4V). The detection electrode Rx_Odd (−) is reset to 4V. The switch S5_EVEN is connected to the $V_{OFSC}$ side ($V_{OFSC}$=2.118V) while turning OFF the switch S2_EVEN and turning ON the switch S3_EVEN. Then the detection electrode Rx_Even is precharged to 4V, and the voltage of 882V (=4V−2.118V) is applied to the calibration capacitance Cc1b.

(4) The integration by the integration circuit 10 as described in the process step (2) is repeated to accumulate the voltage.

(5) After completion of the integration by the integration circuit 10, the switch S4_EVEN is turned ON to allow the sample hold circuit 11 to conduct the sample & hold. Thereafter, the switch S6_EVEN is sequentially turned ON to perform AD conversion by the AD converter 12 so that the RAW data corresponding to the even-numbered detection electrodes Rx_Even are stored in the memory (RAM) 13.

If the AD converter 12 is the 10-bit AD converter, the RAW data are in the range from 0 (integral 0V) to 1023 (integral 4V).

(6) The process steps from (1) to (5) are sequentially executed for all the even-numbered detection electrodes Rx_Even so as to store the RAW data corresponding to the adjacent single plane of the even-numbered detection electrodes Rx_Even and the odd-numbered detection electrodes Rx_Odd in the memory 13.

(7) As the capacitance value of the detection capacitance Crx-rx in the untouched state is larger than the one in the touched state, the drop in the output voltages ($V_{INT}$) through the integration circuit 10 varies depending on the aforementioned state. Then threshold values are set to detect existence of the touch or the swipe.

The detection signal is output in the vertical direction in accordance with the touched point. Therefore, the intermediate value (RAW data=511) of the 10-bit AD converter is set as the calibration target value ($V_{CLBT}$) as shown in FIG. 15B. When the point at the side (A) as shown in FIG. 15A is touched, the output voltage ($V_{INT}$) of the integration circuit 10 becomes the voltage ($V_{INT}$(A)) higher than the calibration target value. When the point at the side (B) as shown in FIG. 15A is touched, the output voltage ($V_{INT}$) of the integration circuit 10 becomes the voltage ($V_{INT}$(B)) lower than the calibration target value.

FIG. 16 shows signal values derived from swiping from the detection electrode Rx12 in the detection electrode Rx2 in the case of the third Tx differential drive. The axial single scale of time denotes the cycle of the touch detection process. The detection electrodes Rx2, Rx4, Rx6 represent the positive signal values, and the detection electrodes Rx8, Rx10, Rx12 represent the negative signal values.

Figure 17A:
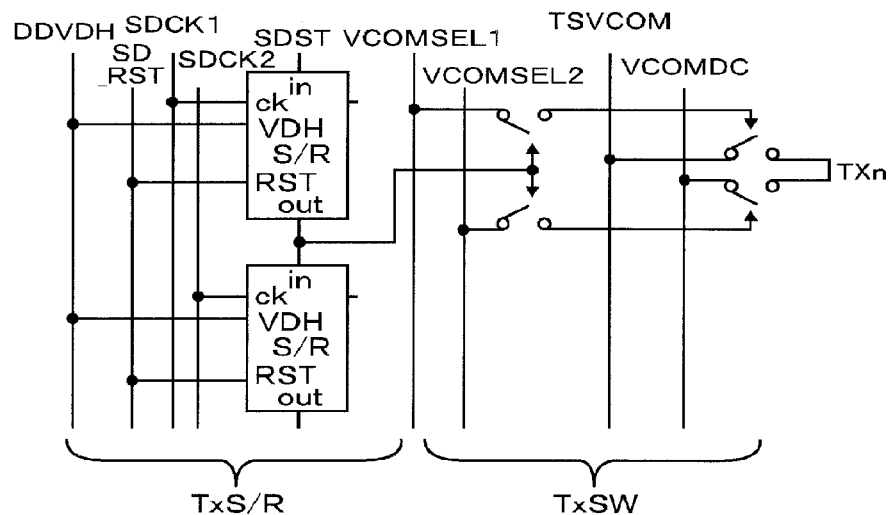
FIG. 17A is a block diagram showing a structure of a Tx scan circuit according to the second embodiment.
Figure 17B:
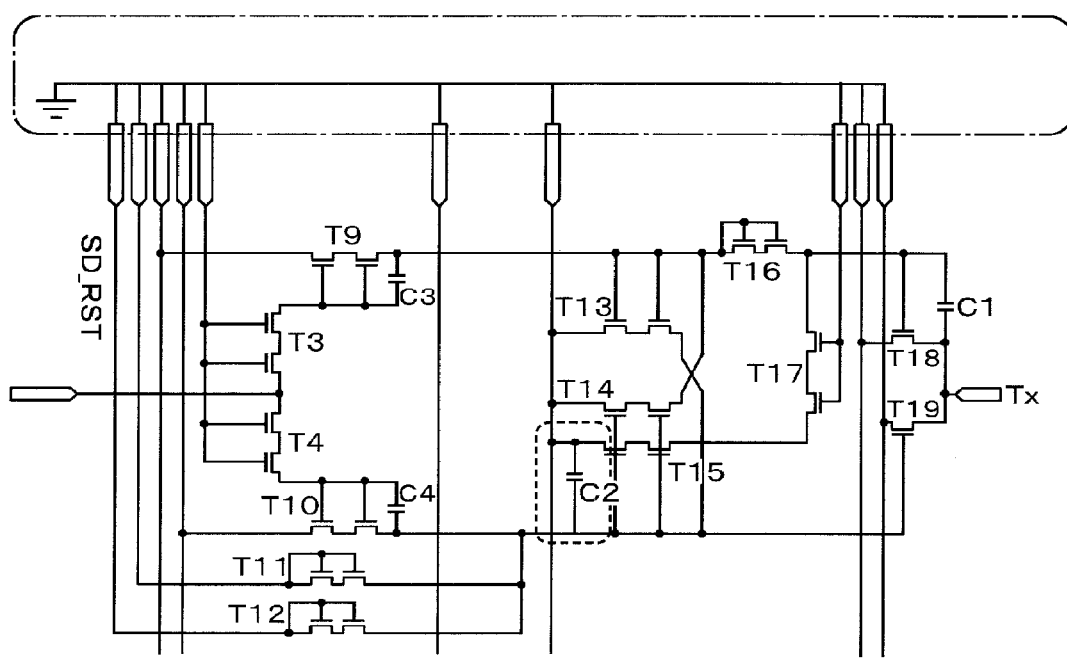
FIG. 17B is a circuit diagram of a switching circuit of the Tx scan circuit according to the second embodiment.
Figure 18A:
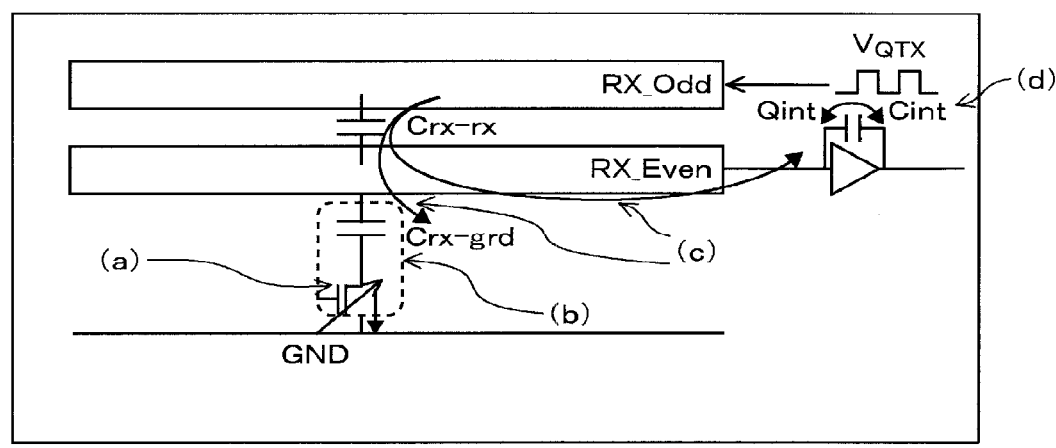
FIG. 18A is a schematic view representing change in the Rx integral quantity.
Figure 18B:
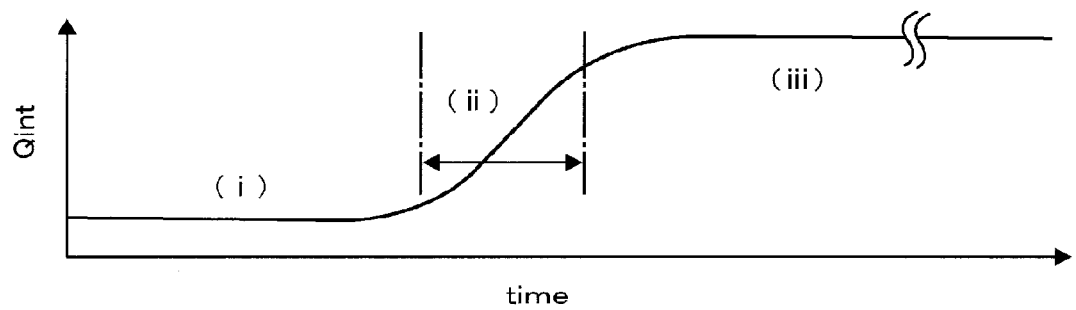
FIG. 18B is a waveform chart representing the change in the Rx integral quantity.
Figure 18C:
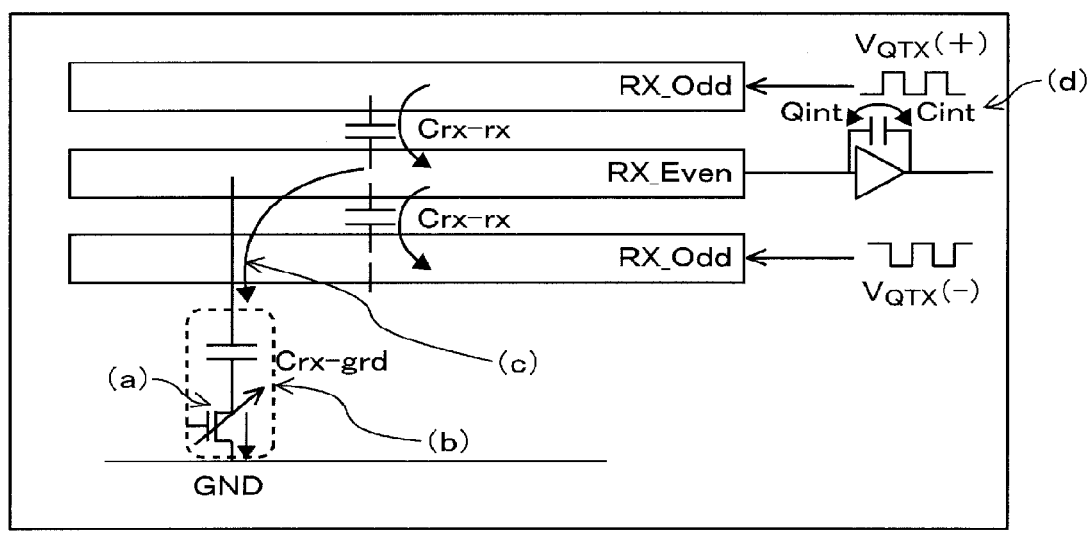
FIG. 18C is a schematic view of the Tx differential drive mode.

FIG. 17A is a block diagram showing the structure of the Tx scan circuit according to the second embodiment. FIG. 17B is a circuit diagram of the switch circuit of the Tx scan circuit according to the second embodiment. FIG. 18A schematically shows the change in the Rx integral amount. FIG. 18B is a waveform chart representing the change in the Rx integral amount. FIG. 18C schematically shows improvement achieved by the Tx differential drive.

The Tx scan circuit 23 includes a switch circuit TxSW and a shift register circuit TxS/R. The switch circuit TxSW includes n-channel-TFT and the capacitance as shown in FIG. 17B. In the sleep mode, the SD_RST signal becomes High, and a thin film transistor T19 is turned ON via the thin film transistor T12 so as to charge the capacitance C2. Subsequent to the power-off-sequence, all the nodes of the input signal are fixed to the GND potential. The capacitance C2 is gradually discharged by the leak current of the thin film transistors T10 and T13. As the thin film transistor T19 makes a transition from ON to open, ON resistance of the thin film transistor T19 varies. Referring to FIG. 18A, when the ON resistance of the thin film transistor T19 varies with the leak current (see (a)), the impedance between the detection electrode Rx_Even and GND varies (see (b)). As a result, the scanning pulse to the temporary scanning electrode (detection electrode R_Odd) changes the charge distribution to the integration capacitance Cint and the self capacitance Crx-gnd of the detection capacitance Cxy-rx (see (c)). Then the integral charge amount (Qint) of the integration capacitance Cint varies (see (d)). The leak current of the thin film transistor has dependency on light, temperature and Vth.

As FIG. 18B shows, in the initial period (i) of the sleep mode, the thin film transistor T19 is in stable ON state. As the integral charge amount (Qint) of the integration capacitance Cint does not vary, it is possible to detect the swipe although the sensitivity is low. In the transition period (ii), the ON resistance varies as described above to change the integral charge amount (Qint). It is therefore difficult to detect the swipe. In the stabilized period (iii), the leak current hardly exists because of the fully discharged state. The ON resistance hardly varies in the open state. As a result, the integral charge amount (Qint) does not vary. It is therefore possible to detect the swipe. The leak current of the thin film transistor has dependency on light, temperature and Vth. The transition period (ii) may be reduced under the rapid leak condition. Therefore, the period for which the swipe cannot be detected may be reduced.

In the second embodiment, The Tx scan circuit 23 is formed on the TFT substrate 2 through TFT, which may cause the problem as described above. The second embodiment is configured that the temporary scanning electrode (detection electrode Rx_Odd) is differential driven with the $V_{QTR}$ (+) and $V_{QTX}$ (−) as shown in FIG. 18C. Therefore, likewise the case shown in FIG. 18B, the ON resistance of the thin film transistor T19 varies with the leak current (see (a)), and the scanning pulse is balanced in spite of change in the impedance between the detection electrode Rx_Even and GND (see (b)). Then the charge is no longer extracted from the self capacitance Crx-gnd with the scanning pulse to the temporary scanning electrode (detection electrode R_Odd) (see (c)). Therefore, the capacitance value ($C_{INT}$) of the integration capacitance Cint is stabilized (see (d)). Then the scanning pulse to the temporary scanning electrode (detection electrode R_Odd) is balanced. This ensures to make the impedance change between the detection electrode Rx_even and GND invisible.

What is claimed is:

1. A display device comprising:
a display panel including an array substrate and a counter substrate;
a pixel electrode between the array substrate and the counter substrate;
a common electrode between the array substrate and the counter substrate; and
a detection circuit;
wherein
the display panel has a detection electrode,
the detection circuit includes a first switch element, a second switch element, an integration circuit, and a pulse voltage circuit outputting the pulse voltage,
in the first mode, the common electrode is supplied a common voltage for display,
in the second mode, the first switch connects between the detection electrode and the pulse voltage circuit for supplying a pulse voltage to the detection electrode, and the second switch connects between the detection electrode and the integration circuit for detecting a voltage of the detection electrode.

2. The display device according to claim 1, wherein the pulse voltage circuit includes a DA converter.

3. The display device according to claim 2, wherein the pulse voltage circuit includes a memory, and the DA converter output the pulse voltage based on a data of the memory.

4. The display device according to claim 1, wherein the integration circuit accumulates a voltage of the detection electrode.

5. The display device according to claim 1, wherein the detection circuit includes sample hold circuit, and the integration circuit output a voltage to the sample hold circuit.

6. The display device according to claim 1, wherein the common electrode is divided into a plurality of blocks.

7. A display device comprising:
a display panel including an array substrate and a counter substrate; and
a detection circuit,
wherein the display panel includes a pixel electrode, a common electrode, a first detection electrode and a second detection electrode;
the first detection electrode and the second detection electrode are alternately arranged; the detection circuit includes an integration circuit and a voltage supply circuit;
in a first mode, the common electrode is supplied a common voltage for displaying,
in a second mode, the voltage supply circuit supplies a pulse voltage to the first detection electrode, and the integration circuit accumulates a voltage of the second detection electrode, the detection circuit includes a first switch and a second switch, the first switch connects the voltage supply circuit and the first detection electrode, and the second switch connects the integration circuit and the second detection electrode.

8. The display device according to claim 7, wherein the detection circuit includes a DA converter.

9. The display device according to claim 8, wherein the detection circuit includes a memory, and the DA converter output the pulse voltage based on a data of the memory.

10. The display device according to claim 7, wherein the detection circuit includes sample hold circuit, and the integration circuit output a voltage to the sample hold circuit.

11. The display device according to claim 7, wherein the common electrode is divided into a plurality of blocks.

\* \* \* \* \*